US006636782B2

(12) United States Patent
Morikawa et al.

(10) Patent No.: US 6,636,782 B2
(45) Date of Patent: Oct. 21, 2003

(54) METHOD OF DRIVING AND CONTROLLING A SOLENOID-OPERATED VALVE

(75) Inventors: Fumio Morikawa, Misato (JP); Nobuyuki Ishitsuka, Satte (JP)

(73) Assignee: SMC Kabushiki Kaisha, Tokyo (JP)

( * ) Notice: Subject to any disclaimer, the term of this patent is extended or adjusted under 35 U.S.C. 154(b) by 149 days.

(21) Appl. No.: 09/953,218

(22) Filed: Sep. 17, 2001

(65) Prior Publication Data

US 2002/0035414 A1 Mar. 21, 2002

(30) Foreign Application Priority Data

Sep. 18, 2000 (JP) ....................................... 2000-282299
Oct. 17, 2000 (JP) ....................................... 2000-317046

(51) Int. Cl.[7] ........................... G05D 7/00; F16K 31/02; G06F 15/46

(52) U.S. Cl. .................... 700/282; 700/13; 137/624.18; 251/129.01

(58) Field of Search ............................. 700/11–16, 275, 700/282; 251/129.01–129.08; 137/624.11–624.2

(56) References Cited

U.S. PATENT DOCUMENTS 3,826,368 A * 7/1974 Walters ...................... 210/741
3,969,703 A * 7/1976 Kwiatkowski et al. ........ 700/13
4,237,932 A * 12/1980 Johnson ................. 137/624.18
4,463,416 A * 7/1984 Wood .......................... 700/14
5,602,728 A * 2/1997 Madden et al. ............... 700/16
5,748,466 A * 5/1998 McGivern et al. ............ 700/17

FOREIGN PATENT DOCUMENTS

JP 5-65967 3/1993
JP 5-180365 7/1993

* cited by examiner

*Primary Examiner*—Leo Picard
*Assistant Examiner*—Douglas S. Lee
(74) *Attorney, Agent, or Firm*—Paul A. Guss

(57) ABSTRACT

A method of driving and controlling a solenoid-operated valve is provided. The solenoid-operated valve can be centrally controlled and managed and it is possible to easily respond to any system change. The solenoid-operated valve is provided with a solenoid-operated valve driving control circuit for receiving solenoid-operated valve opening/closing control data from a serial bus as serial data including two bits for each of two solenoid-operated valve coils of the solenoid-operated valve; converting the data into parallel data; driving the solenoid-operated valve coils based on one bit of the two bits for each solenoid-operated valve coil in parallel data; driving light emitting diodes based on the other bit; and inputting an output from a sensor for detecting each of open and closed states of the solenoid-operated valve and a signal indicating whether each of the solenoid-operated valve coils has a single-coil structure or a double-coil structure by a switch; and converting the input data for sending to the serial bus.

16 Claims, 31 Drawing Sheets

FIG. 5

| NUMBER | BIT FUNCTION | |
|---|---|---|
| BIT 0 | START BIT (L) | |
| BIT 1 | ADDRESS $2^0$ | |
| BIT 2 | ADDRESS $2^1$ | |
| BIT 3 | ADDRESS $2^2$ | |
| BIT 4 | ADDRESS $2^3$ | |
| BIT 5 | ADDRESS $2^4$ | |
| BIT 6 | ADDRESS $2^5$ | |
| BIT 7 | OPERATION MODE BIT | |
| BIT 8 | ADDRESS MODE PARITY BIT | |
| BIT 9 | CH1 OUT1 (COIL1) | STOP BIT |
| BIT 10 | CH1 OUT2 (LED1) | STOP BIT |
| BIT 11 | CH1 OUT3 (COIL2) | |
| BIT 12 | CH1 OUT4 (LED2) | |
| BIT 13 | CH1 PARITY BIT | |
| BIT 14 | CH2 OUT1 (COIL1) | |
| BIT 15 | CH2 OUT2 (LED1) | |
| BIT 16 | CH2 OUT3 (COIL2) | |
| BIT 17 | CH2 OUT4 (LED2) | |
| BIT 18 | CH2 PARITY BIT | |
| BIT 19 | CH3 OUT1 (COIL1) | |
| BIT 20 | CH3 OUT2 (LED1) | |
| BIT 21 | CH3 OUT3 (COIL2) | |
| BIT 22 | CH3 OUT4 (LED2) | |
| BIT 23 | CH3 PARITY BIT | |
| BIT 24 | CH4 OUT1 (COIL1) | |
| BIT 25 | CH4 OUT2 (LED1) | |
| BIT 26 | CH4 OUT3 (COIL2) | |
| BIT 27 | CH4 OUT4 (LED2) | |
| BIT 28 | CH4 PARITY BIT | |
| BIT 29 | OUTPUT SYNCHRONIZATION BIT | |
| BIT 30 | STOP BIT (L) | |
| BIT 31 | STOP BIT (L) | |

FIG. 6

| NUMBER | BIT FUNCTION | |
|---|---|---|
| BIT 0 | START BIT (L) | |
| BIT 1 | ADDRESS $2^0$ | |
| BIT 2 | ADDRESS $2^1$ | |
| BIT 3 | ADDRESS $2^2$ | |
| BIT 4 | ADDRESS $2^3$ | |
| BIT 5 | ADDRESS $2^4$ | |
| BIT 6 | ADDRESS $2^5$ | |
| BIT 7 | OPERATION MODE BIT | |
| BIT 8 | ADDRESS MODE PARITY BIT | |
| BIT 9 | CH1 IN1 | IN1 |
| BIT 10 | CH1 IN2 | IN2 |
| BIT 11 | CH1 SINGLE/DOUBLE | IN3 |
| BIT 12 | CH1 ENABLE | IN4 |
| BIT 13 | CH1 PARITY BIT | P1 |
| BIT 14 | CH2 IN1 | IN5 |
| BIT 15 | CH2 IN2 | IN6 |
| BIT 16 | CH2 SINGLE/DOUBLE | IN7 |
| BIT 17 | CH2 ENABLE | IN8 |
| BIT 18 | CH2 PARITY BIT | P2 |
| BIT 19 | CH3 IN1 | IN9 |
| BIT 20 | CH3 IN2 | IN10 |
| BIT 21 | CH3 SINGLE/DOUBLE | IN11 |
| BIT 22 | CH3 ENABLE | IN12 |
| BIT 23 | CH3 PARITY BIT | P3 |
| BIT 24 | CH4 IN1 | IN13 |
| BIT 25 | CH4 IN2 | IN14 |
| BIT 26 | CH4 SINGLE/DOUBLE | IN15 |
| BIT 27 | CH4 ENABLE | IN16 |
| BIT 28 | CH4 PARITY BIT | P4 |
| BIT 29 | JUDGMENT OF INPUT AND OUTPUT | |
| BIT 30 | STOP BIT (L) | |
| BIT 31 | STOP BIT (L) | |

FIG. 8A

| NUMBER | BIT FUNCTION |
|---|---|
| BIT 0 | START BIT (L) |
| BIT 1 | CH*-OUT1 |
| BIT 2 | CH*-OUT2 |
| BIT 3 | CH*-OUT3 |
| BIT 4 | CH*-OUT4 |
| BIT 5 | PARITY CHECK |
| BIT 6 | STOP BIT |
| BIT 7 | STOP BIT |

FIG. 8B

| NUMBER | BIT FUNCTION |
|---|---|
| BIT 0 | START BIT (L) |
| BIT 1 | CH*-IN1 |
| BIT 2 | CH*-IN2 |
| BIT 3 | CH*-S/$\overline{D}$ |
| BIT 4 | PARITY CHECK |
| BIT 5 | STOP BIT |
| BIT 6 | STOP BIT |

58A-1
58A-2
58A-3
58A-4
COILS A, B
56-1
56-2
56-3
56-4
1ST
2ND
nTH
56
OUT1
OUT2
OUT3
OUT4
OUTn
COMMON POWER SOURCE 58B-1
58B-2
58B-3
58B-4
COIL A
57-1
57-2
57-3
57-4
57

FIG. 21

| NUMBER | BIT FUNCTION | |
|---|---|---|
| BIT 0 | START BIT (L) | |
| BIT 1 | ADDRESS $2^0$ | |
| BIT 2 | ADDRESS $2^1$ | |
| BIT 3 | ADDRESS $2^2$ | |
| BIT 4 | ADDRESS $2^3$ | |
| BIT 5 | ADDRESS $2^4$ | |
| BIT 6 | ADDRESS $2^5$ | |
| BIT 7 | OPERATION MODE BIT | |
| BIT 8 | ADDRESS MODE PARITY BIT | |
| BIT 9 | CH1 IN1 | IN1 |
| BIT 10 | CH1 IN2 | IN2 |
| BIT 11 | CH1 IN3 | IN3 |
| BIT 12 | CH1 SINGLE/DOUBLE | IN4 |
| BIT 13 | CH1 ENABLE | P1 |
| BIT 14 | CH1 PARITY BIT | IN5 |
| BIT 15 | CH2 IN1 | IN6 |
| BIT 16 | CH2 IN2 | IN7 |
| BIT 17 | CH2 IN3 | IN8 |
| BIT 18 | CH2 SINGLE/DOUBLE | P2 |
| BIT 19 | CH2 ENABLE | IN9 |
| BIT 20 | CH2 PARITY BIT | IN10 |
| BIT 21 | CH3 IN1 | IN11 |
| BIT 22 | CH3 IN2 | IN12 |
| BIT 23 | CH2 IN3 | P3 |
| BIT 24 | CH3 SINGLE/DOUBLE | IN13 |
| BIT 25 | CH3 ENABLE | IN14 |
| BIT 26 | CH3 PARITY BIT | IN15 |
| BIT 27 | CH4 IN1 | IN16 |
| BIT 28 | CH4 IN2 | P4 |
| BIT 29 | CH4 IN3 | JUDGMENT OF INPUT AND OUTPUT |
| BIT 30 | CH4 SINGLE/DOUBLE | STOP BIT (L) |
| BIT 31 | CH4 ENABLE | STOP BIT (L) |
| BIT 32 | CH4 PARITY BIT | |
| BIT 33 | JUDGMENT OF INPUT AND OUTPUT | |
| BIT 34 | STOP BIT (L) | |
| BIT 35 | STOP BIT (L) | |

FIG. 22

| NUMBER | BIT FUNCTION |
|---|---|
| BIT 0 | START BIT (L) |
| BIT 1 | CH*-IN1 |
| BIT 2 | CH*-IN2 |
| BIT 3 | CH*-IN3 |
| BIT 4 | CH*-S/$\overline{D}$ |
| BIT 5 | PARITY CHECK |
| BIT 6 | STOP BIT |
| BIT 7 | STOP BIT |

METHOD OF DRIVING AND CONTROLLING A SOLENOID-OPERATED VALVE

BACKGROUND OF THE INVENTION

1. Field of the Invention

The present invention relates to a method of driving and controlling a solenoid-operated valve. The solenoid-operated valve opens/closes by receiving a serial driving signal outputted from a superordinate control apparatus and sends an operation state signal to the superordinate control apparatus.

2. Description of the Related Art

Automatic assembling systems are adopted for the process of assembling machines and tools, etc. by operating a plurality of solenoid-operated valves. The automatic assembling systems perform the automatic assembling such that the supply and the cutoff of compressed air to a cylinder or the like are controlled by using the solenoid-operated valve, and the position of an object is controlled by the cylinder or the like.

The automatic assembling system as described above is large-scaled, and a large number of solenoid-operated valves are used therein. It is preferable that the solenoid-operated valves are controlled centrally, and that the management is made centrally, to know whether or not the solenoid-operated valves are correctly operated based on a control signals for the solenoid-operated valves. Further, it is also preferable to realize the adaptability to easily change the control pattern for the respective solenoid-operated valves and easily add or eliminate the solenoid-operated valve in response to any changes of the automatic assembling system.

However, there has been no method of driving and controlling solenoid-operated valves in which the driving control and the management of the solenoid-operated valve as described above can be centrally performed and it is possible to easily respond to changes of the system.

SUMMARY OF THE INVENTION

An object of the present invention is to provide a method of driving and controlling a solenoid-operated valve in which the solenoid-operated valve can be centrally controlled and managed and it is possible to easily respond to changes of the system.

In a method of driving and controlling a solenoid-operated valve according to a first aspect of the present invention, solenoid-operated valve opening/closing control data is inputted from a serial bus as serial data including two bits for each solenoid-operated valve coil of the solenoid-operated valve; converting the solenoid-operated valve opening/closing control data into parallel data; driving the corresponding solenoid-operated valve coil based on one bit of the two bits for each solenoid-operated valve coil in the parallel data; driving a first light emitting diode based on another bit; inputting an output from a sensor for detecting at least one of open and closed states of the solenoid-operated valve and a signal indicating whether the solenoid-operated valve coil has a single-coil structure or a double-coil structure as input data; and converting the input data into serial data for sending to the serial bus.

Therefore, according to the method of driving and controlling the solenoid-operated valve of the first aspect of the present invention, the solenoid-operated valve opening/closing control data supplied to the solenoid-operated valve, the detected signal of at least one of the open and closed states of the solenoid-operated valve outputted from the solenoid-operated valve, and the signal indicating whether the solenoid-operated valve coil has the single-coil structure or the double-coil structure are sent in the serial data structure. It is possible to centrally perform the management, for example, for driving the solenoid-operated valve and opening/closing the solenoid-operated valve by driving.

In a method of driving and controlling a solenoid-operated valve according to a second aspect of the present invention, solenoid-operated valve opening/closing control data is inputted from a serial bus as serial data including two bits for each solenoid-operated valve coil of the solenoid-operated valve; converting the solenoid-operated valve opening/closing control data into parallel data; driving the corresponding solenoid-operated valve coil based on one bit of the two bits for each solenoid-operated valve coil in the parallel data; driving a first light emitting diode based on another bit; inputting an output from a plurality of sensors for detecting open, closed, and intermediate positions of the solenoid-operated valve and a signal indicating whether the solenoid-operated valve coil has a single-coil structure or a double-coil structure as input data; and converting the input data into serial data for sending to the serial bus.

Therefore, according to the method of driving and controlling the solenoid-operated valve of the second aspect of the present invention, the solenoid-operated valve opening/closing control data supplied to the solenoid-operated valve, the detected signals of the open, closed, and intermediate positions of the solenoid-operated valve outputted from the solenoid-operated valve, and the signal indicating whether the solenoid-operated valve coil has the single-coil structure or the double-coil structure are sent in the serial data structure. It is possible to centrally perform the management, for example, for driving the solenoid-operated valve and opening, positioning intermediately, or closing the solenoid-operated valve by driving.

In the method of driving and controlling the solenoid-operated valve according to the first and second aspects of the present invention, when the solenoid-operated valve has the single-coil structure, it is enough that the solenoid-operated valve having the single-coil structure is connected and that the signal indicating the single-coil structure is inputted. It is possible to respond to both of the solenoid-operated valve of the double-coil structure and the solenoid-operated valve of the single-coil structure. It is also easy to respond to any changes of the system, so that the entire system will have large adaptability.

In the method of driving and controlling the solenoid-operated valve according to the first and second aspects of the present invention, when the two bits for each of the two solenoid-operated valve coils of the solenoid-operated valve have the same data, the driving of the solenoid-operated valve can be simulated in accordance with the light emission of the first light emitting diode, and it is easy to perform maintenance and check, even when the solenoid-operated valve coil is not connected. That is, when the two bits for each of the two solenoid-operated valve coils of the solenoid-operated valve are the same data, it is possible to judge the breaking of wire of the solenoid-operated valve coil if the solenoid-operated valve is not driven although the solenoid-operated valve coil is supposed to be connected and the first light emitting diode emits light. Thus, it is easy to perform maintenance.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 illustrates a transmission data format of serial data structure to be used for the method of driving and controlling the solenoid-operated valve according to the first embodiment of the present invention;

FIG. 6 illustrates a response data format of serial data structure to be used for the method of driving and controlling the solenoid-operated valve according to the first embodiment of the present invention;

FIG. 8A illustrates a transmission data format to be used for the method of driving and controlling the solenoid-operated valve according to the first embodiment of the present invention, and FIG. 8B illustrates a format for response data from the solenoid-operated valve driving control circuit to be used for the method of driving and controlling the solenoid-operated valve according to the first embodiment of the present invention;

FIG. 21 illustrates a response data format of serial data structure to be used for the method of driving and controlling the solenoid-operated valve according to the second embodiment of the present invention;

FIG. 22 illustrates a format for response data from a solenoid-operated valve driving control circuit according to the second embodiment of the present invention;

DESCRIPTION OF THE PREFERRED EMBODIMENTS

The method of driving and controlling a solenoid-operated valve according to the present invention will be explained below in accordance with a first embodiment.

Figure 1:
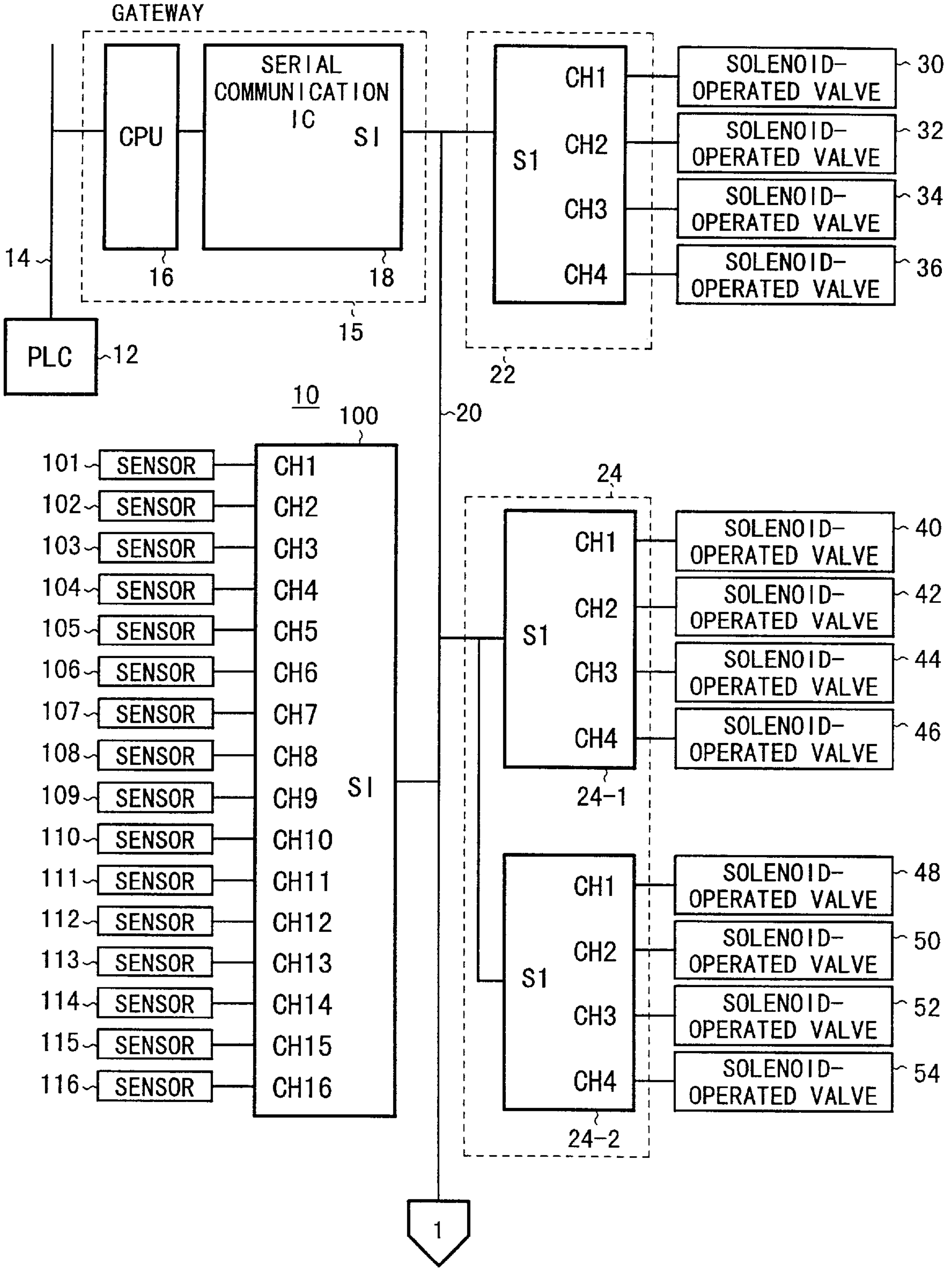
FIG. 1 shows a system configuration as an example of a method of driving and controlling a solenoid-operated valve according to a first embodiment of the present invention.
Figure 2:
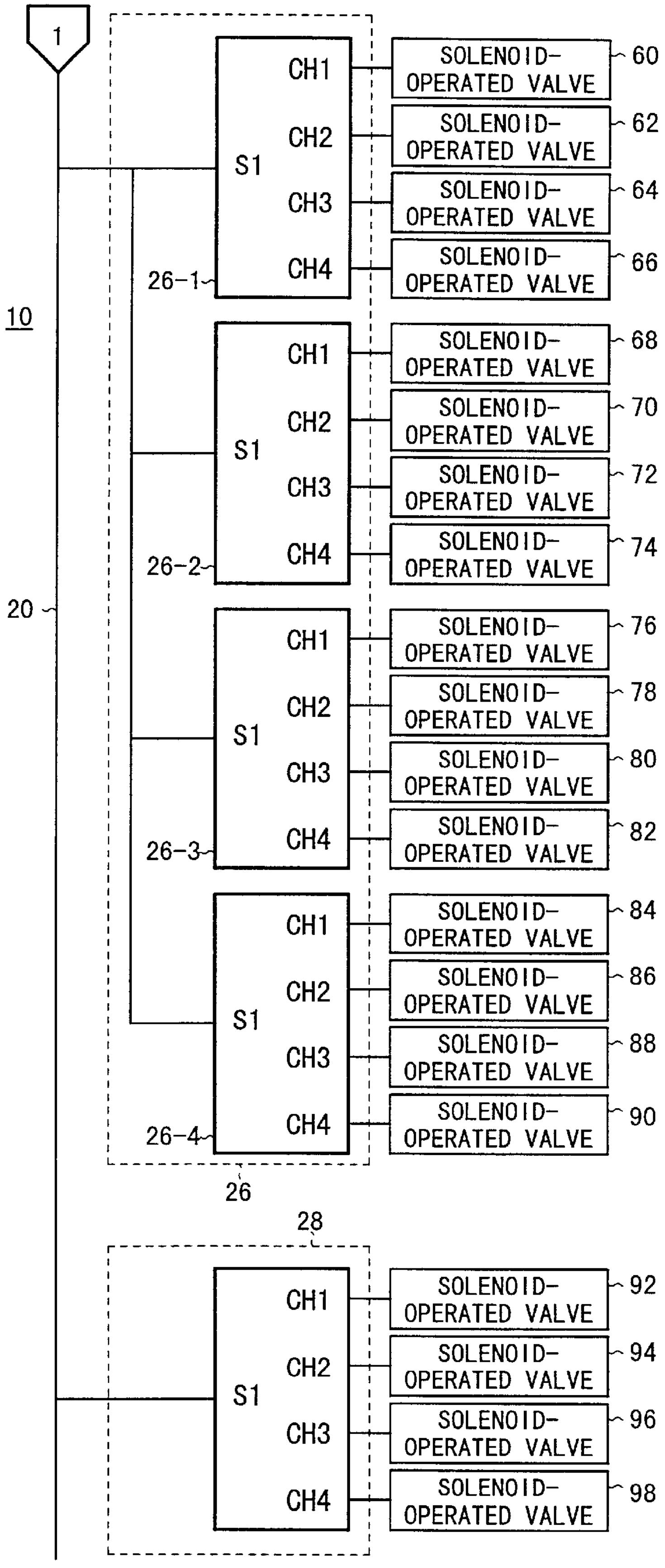
FIG. 2 shows a system configuration as an example of the method of driving and controlling the solenoid-operated valve according to the first embodiment of the present invention.

FIGS. 1 and 2 show a system configuration illustrating an example of the method of driving and controlling the solenoid-operated valve according to the first embodiment of the present invention.

In a driving and controlling apparatus 10 for the method of driving and controlling the solenoid-operated valve according to the first embodiment of the present invention shown in FIGS. 1 and 2, a programmable logic controller (PLC) 12 outputs a solenoid-operated valve operation control signal to a gateway 15 via a field bus 14. The gateway 15 includes a CPU 16 and a serial communication integrated circuit 18 for receiving the output from the CPU 16 and converting the signal into the serial signal to transmit. The protocol of the signal from the PLC 12 via the field bus 14 is converted into the serial data, and the serial data is sent for the solenoid-operated valve opening/closing control to a solenoid-operated valve control bus 20.

The driving and controlling apparatus 10 for the solenoid-operated valve receives serial data at the gateway 15 from a sensor such as a magnetic sensor detecting the state of the solenoid-operated valve via the solenoid-operated valve control bus 20. The serial data is management data including management information for the solenoid-operated valve or the like. The data is subjected to protocol conversion in the gateway 15 for transmission to the PLC 12 via the field bus 14.

The serial data for the opening/closing control for the solenoid-operated valve is supplied from the gateway 15 to the solenoid-operated valve control bus 20. The serial data includes address data for designating communication control integrated circuits 22, 24-1, 24-2, 26-1, 26-2, 26-3, 26-4, 28 and opening/closing operation control data for the respective solenoid-operated valves to be controlled by serial data outputted from the communication control integrated circuits 22, 24, 26, 28. The communication control integrated circuits 22, 24-1, 24-2, 26-1, 26-2, 26-3, 26-4, 28 control respective solenoid-operated valves which make at least one group including a plurality of solenoid-operated valves. In this configuration, each of the communication control integrated circuits 22, 24, 26, 28 is allotted to one of the groups of solenoid-operated valves and transmits opening/closing control data in serial data structure to control the solenoid-operated valves of the group. The opening/closing control data is transmitted from channels CH1 to CH4 corresponding to the solenoid-operated valves, respectively. Accordingly, the opening/closing operations of the respective solenoid-operated valves are controlled by solenoid-operated valve driving control circuits 202 shown in FIG. 3 as described later on.

Explanation will be made below through a case in which each of the solenoid-operated valves according to the first embodiment of the present invention is a two-position solenoid-operated valve with open and closed states.

In the first embodiment of the present invention, the communication control integrated circuit 22 uses the respective outputs from the channels CH1 to CH4 so that the four solenoid-operated valves 30, 32, 34, 36 in one group are individually subjected to opening/closing control by the solenoid-operated valve driving control circuit 202. The solenoid-operated valve driving control circuit 202 also controls the transmission of the open/closed state signal.

The communication control integrated circuit 24 includes the communication control integrated circuits 24-1, 24-2. The communication control integrated circuit 26 includes the communication control integrated circuits 26-1, 26-2, 26-3, 26-4. The communication control integrated circuits 24-1, 24-2, 26-1, 26-2, 26-3, 26-4 individually control the opening/closing of the four solenoid-operated valves 40, 42, 44, 46 in one group, the four solenoid-operated valves 48, 50, 52, 54 in one group, the four solenoid-operated valves 60, 62, 64, 66 in one group, the four solenoid-operated valves 68, 70, 72, 74 in one group, the four solenoid-operated valves 76, 78, 80, 82 in one group, and the four solenoid-operated valves 84, 86, 88, 90 in one group, by the solenoid-operated valve driving control circuit 202 through the outputs of the respective channels CH1 to CH4. The communication control integrated circuits 24-1, 24-2, 26-1, 26-2, 26-3, 26-4 also control the transmission of their open/closed state signals.

Similarly, the communication integrated circuit 28 individually controls the opening/closing of the four solenoid-operated valves 92, 94, 96, 98 in one group by the solenoid-operated valve driving control circuit 202 through the respective outputs of the channels CH1 to CH4. The communication integrated circuit 28 also controls the transmission of their open/closed state signals.

In the configuration described above, each of the communication control integrated circuits 22, 24-1, 24-2, 26-1, 26-2, 26-3, 26-4, 28 distinguishes the address allotted thereto with an address decoder. The opening/closing control data for the solenoid-operated valve at the allotted address is incorporated into a shift register. Parallel/serial conversion is performed for each of the channels CH. The serial data for each of the channels CH is transmitted to a communication control integrated unit 200 shown in FIG. 3, which is provided for the solenoid-operated valve corresponding to each of the channels CH.

Further, each of the communication control integrated circuits 22, 24-1, 24-2, 26-1, 26-2, 26-3, 26-4, 28 is provided with a parallel/serial converter for incorporating serial data inputted into each channel CH to convert into parallel data and individually forming parallel data for all of the channels from the channel CH 1 to the channel CH4 for converting the formed parallel data into serial data. Each of the communication control integrated circuits 22, 24-1, 24-2, 26-1, 26-2, 26-3, 26-4, 28, is also provided with an address-adding circuit for adding allotted address to the serial data for transmitting the data to the solenoid-operated valve control bus 20.

Each output data from external sensors 101, 102, 103, 104, 105, 106, 107, 108, 109, 110, 112, 113, 114, 115, 116 for detecting, for example, the position of the workpiece and the position of the cylinder piston of this system is supplied to the communication control integrated circuit 100. The data is transmitted from the communication control integrated circuit 100 via the solenoid-operated valve control bus 20 to the gateway 15. In this configuration, the communication control integrated circuit 100 includes a parallel/serial converter for converting each of the outputs from the external sensors into serial data, and an address-adding circuit. The inputted sensor outputs are converted into serial data and transmitted after being added with address data allotted to the communication control integrated circuit 100.

Next, explanation will be made with reference to FIGS. 3 and 4 for the communication control integrated unit 200 provided for the solenoid-operated valve 30. Because all of the communication control integrated units 200 provided for the solenoid-operated valves 30, 32, 34, 36, 40, 42, 44, 46, 48, 50, 52, 54, 60, 62, 64, 66, 68, 70, 72, 74, 76, 78, 80, 82, 84, 86, 88, 90, 92, 94, 96, 98 are identically constructed, detailed explanation of the communication control integrated units 200 is not repeated.

The communication control integrated unit 200 includes the solenoid-operated valve driving control circuit 202 as an integrated circuit. The solenoid-operated valve driving control circuit 202 is provided for the solenoid-operated valve 30.

Figure 4:
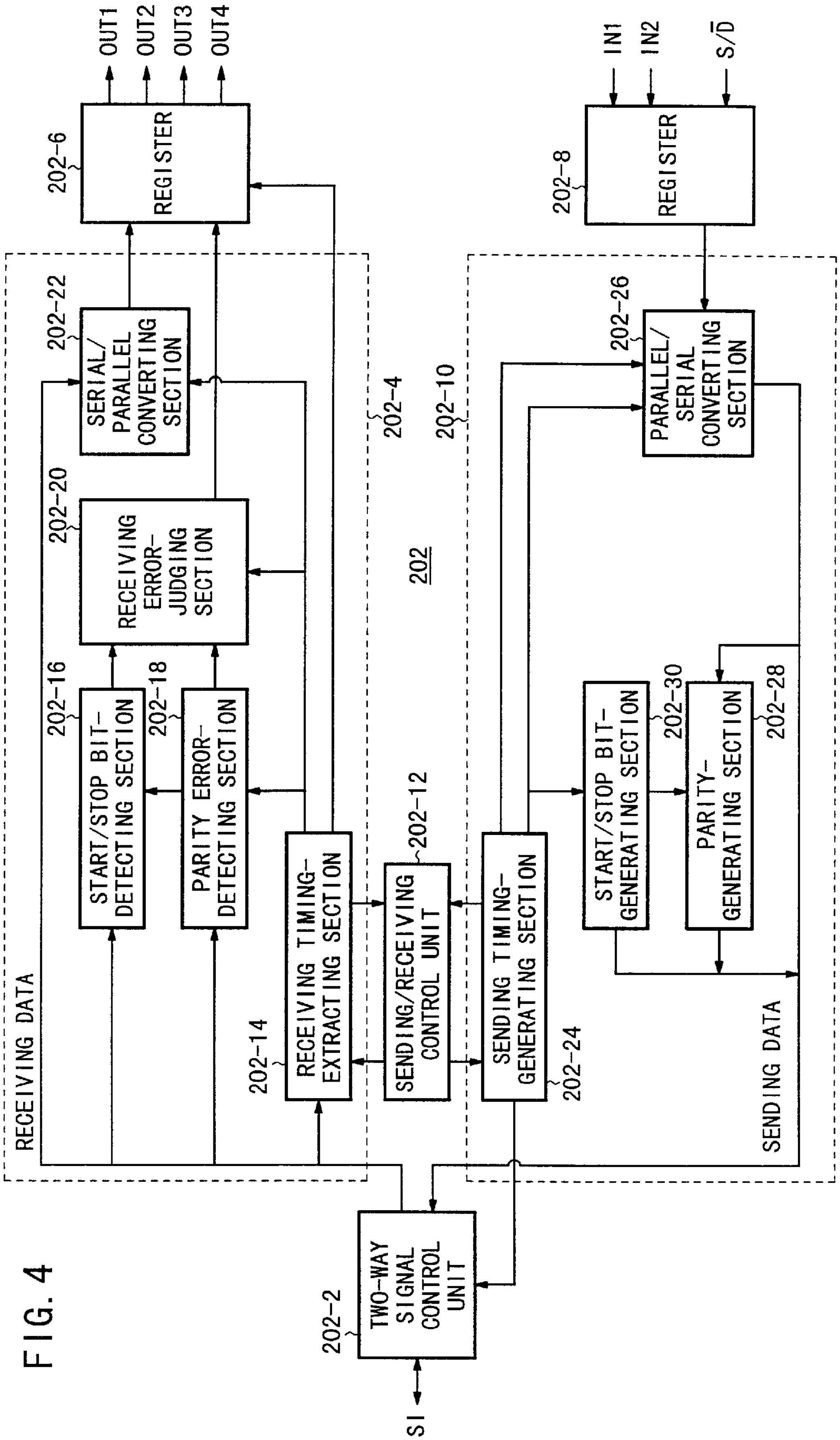
FIG. 4 is a block diagram illustrating the solenoid-operated valve driving control circuit to be used for the method of driving and controlling the solenoid-operated valve according to the first embodiment of the present invention.

As shown in FIG. 4, the solenoid-operated valve driving control circuit 202 comprises a two-way signal control unit 202-2 for receiving the serial data SI and sending the data, a serial data-receiving unit 202-4 for receiving the serial data SI via the two-way signal control unit 202-2, an output data register unit 202-6 for outputting the data from the serial data-receiving unit 202-4 to terminals OUT1 to OUT4, an input data register unit 202-8 for receiving the data from input terminals IN1, IN2, S/D* (D* herein means negative logic), a serial data-sending unit 202-10 for receiving the data of the input data register unit 202-8 and sending serial data via the two-way signal control unit 202-2, and a sending/receiving control unit 202-12 for controlling start and end of receiving data of the serial data-receiving unit 202-4 and controlling start and end of sending data of the serial data-sending unit 202-10.

The serial data-receiving unit 202-4 includes a receiving timing-extracting section 202-14 for instructing the update of received data in the output data register unit 202-6, a start/stop bit-detecting section 202-16 for receiving the receiving timing signal from the receiving timing-extracting section 202-14 and detecting the start/stop bit, a parity error-detecting section 202-18 for receiving the receiving timing signal-from the receiving timing-extracting section 202-14 and detecting a parity error, a receiving error-judging section 202-20 for receiving the outputs of the start/stop bit-detecting section 202-16 and the parity error-detecting section 202-18 and judging a receiving error, and a serial/parallel converting section 202-22 for converting the receiving data into parallel data. A receiving data effective signal showing that the receiving data is effective is sent to the output data register unit 202-6 when the receiving error is not detected by the receiving error-judging section 202-20. Then, the parallel data converted by the serial/parallel converting section 202-22 is registered in the output data register unit 202-6.

The serial data-sending unit 202-10 includes a parallel/serial converting section 202-26 for converting the data inputted into the input terminal of the input data register unit 202-8 into serial data, a parity-generating section 202-28 for generating a parity bit based on the serial data converted by the parallel/serial converting section 202-26, a start/stop bit-generating section 202-30 for generating a start bit and a stop bit, and a sending timing-generating section 202-24 for receiving instruction of start and end of sending from the sending/receiving control unit 202-12 to generate a sending timing signal, making instruction of updating sending data and instruction of sending timing for the parallel/serial converting section 202-26, and then making instruction of sending for the two-way signal control unit 202-2. The start bit and the stop bit generated by the start/stop bit-generating section 202-30 are added to the serial data converted by the parallel/serial converting section 202-26, and the parity bit, which is generated by the parity-generating section 202-28, is added thereto for sending the data to the two-way signal control unit 202-2.

Figure 3:
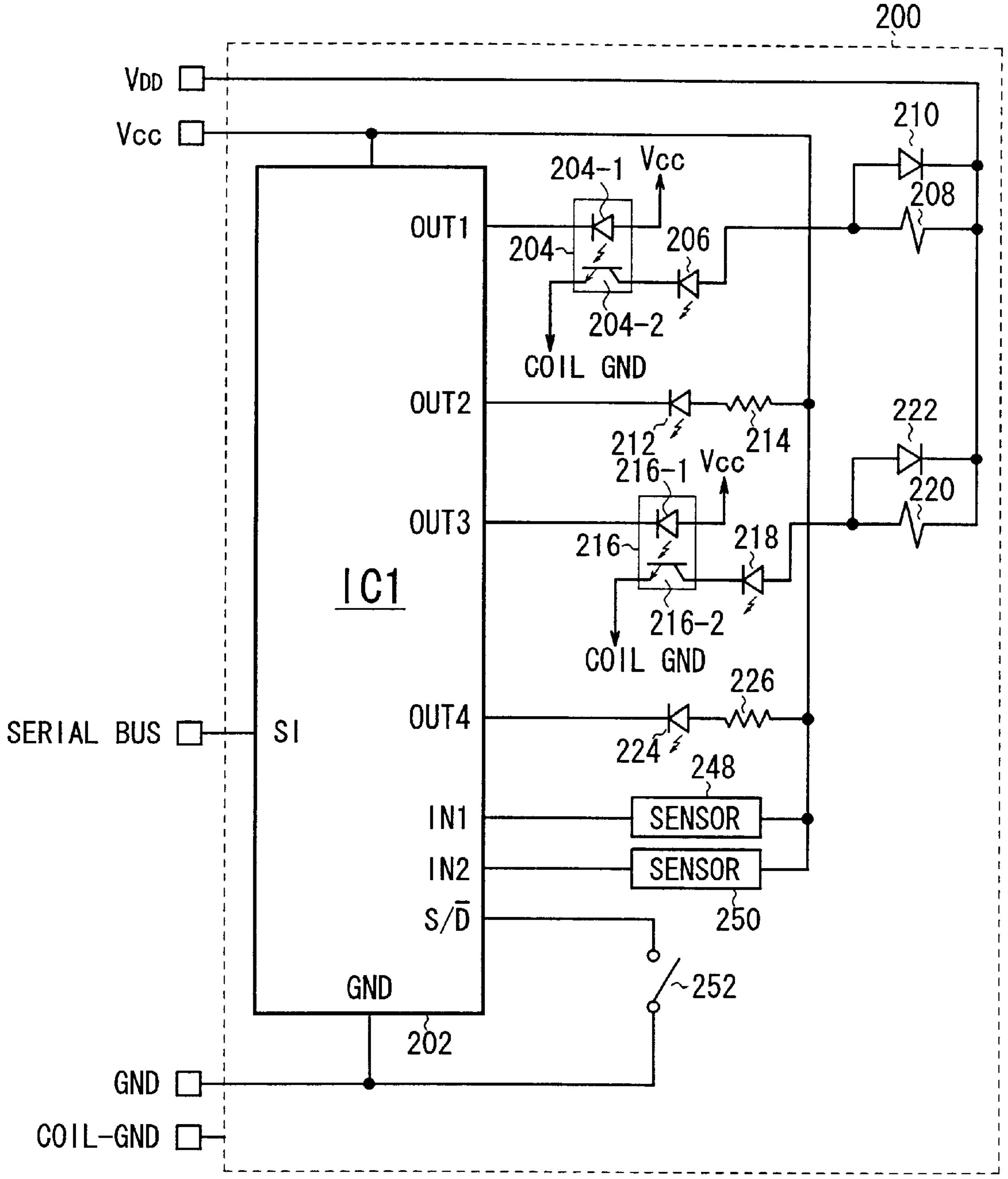
FIG. 3 illustrates a solenoid-operated valve driving control circuit to be used for the method of driving and controlling the solenoid-operated valve according to the first embodiment of the present invention.

As shown in FIG. 3, the solenoid-operated valve driving control circuit 202 receives the serial data outputted from the channel CH1 of the communication control integrated circuit 22 to convert into parallel data to be outputted to the terminals OUT1 to OUT4. The excitation and the non-excitation of the solenoid-operated valve coils 208, 220 are individually controlled depending on the outputs of the output terminals OUT1 and OUT3. On the other hand, the solenoid-operated valve driving control circuit 202 receives, at the sensor input terminals IN1, IN2, the signal (solenoid-operated valve OPEN signal) indicating that the solenoid-operated valve is turned ON (solenoid-operated valve OPEN) and the signal (solenoid-operated valve CLOSED signal) indicating that the solenoid-operated valve is turned OFF (solenoid-operated valve CLOSED) detected by the sensors 248, 250 to perform parallel/serial conversion. After conversion, the serial data is transmitted to the communication control integrated circuit 22.

Further, the solenoid-operated valve driving control circuit 202 judges whether the solenoid-operated valve has the single-coil structure or the double-coil structure based on the electric potential of the input terminal S/D*. The input terminal S/D* is selectively grounded by a switch 252 to send the judgment signal as the enable signal to the communication control integrated circuit 22. In FIG. 3, the power source $V_{CC}$ indicates the power source for the solenoid-operated valve driving control circuit 202, and the power source $V_{DD}$ indicates the power source for the solenoid-operated valve coil.

In particular, the output data supplied from the output terminal OUT1 of the solenoid-operated valve driving control circuit 202 is applied to the solenoid-operated valve coil 208 via a light emitting diode 206 and a photocoupler 204 for driving the solenoid-operated valve coil 208. The photocoupler 204 comprises a phototransistor 204-2 (e.g., an NPN transistor) and a light emitting diode 204-1 for an interface. The output data supplied from the output terminal OUT3 of the solenoid-operated valve driving control circuit 202 is applied to the solenoid-operated valve coil 220 via a light emitting diode 218 and a photocoupler 216 for driving the solenoid-operated valve coil 220. The photocoupler 216 comprises a phototransistor 216-2 and a light emitting diode 216-1 for an interface.

The reason why the photocouplers 204, 216 are provided is that it is intended to electrically isolate the output voltage of the solenoid-operated valve driving control circuit 202 from the voltage to be applied to the solenoid-operated valve coil 208, 220. In place of the photocoupler 204, 206, a relay may be used if there is enough operation time. The reason why the light emitting diodes 206, 218 are connected is that it is intended to visually judge whether or not the instruction of excitation is given to the solenoid-operated valve coil 208, 220. The diodes 210, 222 are connected to the solenoid-operated valve coils 208, 220 in parallel for the snubber operation.

The light emitting diode 212 is driven with the output from the output terminal OUT2 of the solenoid-operated valve driving control circuit 202 by using the current restricted by a resistor 214. The light emitting diode 224 is driven with the output from the output terminal OUT4 of the solenoid-operated valve driving control circuit 202 by using the current restricted by a resistor 226. The reason why this configuration is adopted is as follows. The light emitting diodes 212, 224 are driven based on the outputs of the output terminals OUT2, OUT4 even in a state that the solenoid-operated valve coils 208, 220 are not connected. Accordingly, the maintenance may be easily performed.

When the solenoid-operated valve has the double-coil structure, as shown in FIG. 3, the photocoupler 204, the solenoid-operated valve coil 208, the light emitting diodes 206, 212, the resistor 214, and the diode 210 are connected, which are driven by the outputs from the output terminals OUT1, OUT2 of the solenoid-operated valve driving control circuit 202. Further, the photocoupler 216, the solenoid-operated valve coil 220, the light emitting diodes 218, 224, the resistor 226, and the diode 222 are connected, which are driven by the outputs from the output terminals OUT3, OUT4 of the solenoid-operated valve driving control circuit 202. The switch 252 is set in the ON state, and the input terminal S/D* is grounded.

When the solenoid-operated valve has the single-coil structure, the photocoupler 204, the solenoid-operated valve coil 208, the light emitting diodes 206, 212, the resistor 214, and the diode 210 are connected, which are driven by the outputs from the output terminals OUT1, OUT2 of the solenoid-operated valve driving control circuit 202 shown in FIG. 3. The switch 252 is set in the OFF state, and the input terminal S/D* is not grounded. The photocoupler 216, the light emitting diodes 218, 224, the solenoid-operated valve coil 220, the resistor 246, and the diode 222 are removed without being connected.

Next, explanation will be made for the function of the driving and controlling apparatus 10 for the solenoid-operated valve constructed as described above.

The serial communication is performed for the PLC 12 and the gateway 15 via the field bus 14. The communication between the PLC 12 and the gateway 15 includes, for example, the opening/closing control data for the solenoid-operated valve, the driving signal for the indicating light emitting diode, the connection information on the solenoid-operated valve coil, and the detection information of each of the sensors. The data format is converted at the gateway 15. The communication of the serial data is performed with respect to the communication control integrated circuits 22, 24, 26, 28, 100 via the solenoid-operated valve control bus 20.

The sending data format outputted from the gateway 15 is as shown in FIG. 5 ranging from a bit 0 to a bit 31. The bit 0 indicates a start bit. A bit 1 to a bit 6 are address data and indicate addresses $2^0$, $2^1$, $2^2$, $2^3$, $2^4$, $2^5$ respectively to designate addresses of the communication control integrated circuits 22, 24-1, 24-2, 26-1, 26-2, 26-3, 26-4, 28, 100. The communication is performed with only the communication control integrated circuit 22, 24, 26, 28, 100 having a coincident address.

A bit 7 of the sending data format is an operation mode bit for indicating whether or not the output data is included in the sending data from the gateway 15. The bit 7 at a logical high level (referred to as "logical H" hereinafter) means a sending mode and the output data for the respective channels CH1 to CH4 of the communication control integrated circuits 22, 24, 26, 28 is included in a bit 9 to a bit 28 of the sending data. The bit 7 at a logical low level (referred to as "logical L" hereinafter) means a reading mode and stop bits are sent to the bit 9 and the bit 10. The bit 8 is an address mode parity bit.

If the operation mode bit (the bit 7) is logical H, the bit 9 to the bit 13 of the sending data format are an output bit from the output terminal OUT1 of the channel CH1, an output bit from the output terminal OUT2, an output bit from the output terminal OUT3, an output bit from the output terminal OUT4, and a parity bit for the channel CH1, respectively.

Similarly, if the operation mode bit (the bit 7) is logical H, the bit 14 to the bit 18 of the sending data format are an output bit from the output terminal OUT1 of the channel CH2, an output bit from the output terminal OUT2, an output bit from the output terminal OUT3, an output bit from the output terminal OUT4, and a parity bit for the channel CH2. The bit 19 to the bit 23 of the sending data format are an output bit from the output terminal OUT1 of the channel CH3, an output bit from the output terminal OUT2, an output bit from the output terminal OUT3, an output bit from the output terminal OUT4, and a parity bit for the channel CH3. The bit 24 to the bit 28 of the-sending data format are an output bit from the output terminal OUT1 of the channel CH4, an output bit from the output terminal OUT2, an output bit from the output terminal OUT3, an output bit from the output terminal OUT4, and a parity bit for the channel CH4, respectively.

A bit 29 of the sending data format is an output synchronization bit. If the bit 29 is logical H, the data of the solenoid-operated valve control bus 20 is set to the communication control integrated circuits 22, 24, 26, 28 to which the corresponding address is allotted. Accordingly, the bit 29 functions as if a strobing pulse is provided for a latching circuit. The setting of data is performed in the PLC 12 in parallel. The set data is converted into serial data and transmitted to the solenoid-operated valve driving control circuit 202 of the communication control integrated unit 200 at the substantially corresponding channel.

For example, if the sending data designates the address of the communication control integrated circuit 22, and the bit 7 is logical H, then the communication control integrated circuit 22 receives the sending data, and it is judged that the communication is performed for itself according to the address. The data from the bit 9 to the bit 29 is received, and the data ranging from the bit 9 to the bit 28 is incorporated in accordance with logical H of the bit 29.

The data ranging from the bit 9 to the bit 12 of the incorporated data ranging from the bit 9 to the bit 29 is converted into serial data and outputted from the channel CH1. Similarly, the data ranging from the bit 14 to the bit 17 of the incorporated data ranging from the bit 9 to the bit 29 are converted into serial data and outputted from the channel CH2. The data ranging from the bit 19 to the bit 22 is converted into serial data and outputted from the channel CH3. The data ranging from the bit 24 to the bit 27 is converted into serial data and outputted from the channel CH4. During this process, it is a matter of course that the parity check is performed by the parity bit 13, the parity bit 18, the parity bit 23, and the parity bit 28.

In particular, the format of the sending serial data outputted from the channel CH1 of the communication control integrated circuit 22 is as shown in FIG. 8A. A bit 0 is a start bit, a bit 1 corresponds to the logical output outputted from the output terminal OUT1 of the channel CH1, a bit 2 corresponds to the logical output outputted from the output terminal OUT2 of the channel CH1, a bit 3 corresponds to the logical output outputted from the output terminal OUT3 of the channel CH1, a bit 4 corresponds to the logical output outputted from the output terminal OUT4 of the channel CH1, a bit 5 is a parity bit, and a bit 6 and a bit 7 are stop bits. The formats of the sending serial data outputted from the channels CH2, CH3, CH4 of the communication control integrated circuit 22 are the same manner as described above.

The inputted serial data is converted into parallel data in the solenoid-operated valve driving control circuit 202 which has received the output serial data from the channel CH1 of the communication control integrated circuit 22. Accordingly, the ON/OFF control is performed for the solenoid-operated valve coils 208, 220 connected to the output terminals OUT1, OUT2, OUT3, OUT4 of the solenoid-operated valve driving control circuit 202, and the flashing of the light emitting diodes 206, 212, 218, 224 is controlled.

Therefore, when the output synchronization bit (the bit 29) is logical H, the outputs of the output terminals OUT1 to OUT4 of the channel CH1 are controlled to be corresponding logical values based on whether or not bits (the bit 9 to the bit 12) are logical H. The solenoid-operated valve coils 208, 220 connected to the output terminals OUT1, OUT3 of the channel CH1 are controlled to be in the excitation or non-excitation state. The light emission of the light emitting diodes 206, 218 connected to the output terminals OUT1, OUT3 of the channel CH1 is controlled. The excitation or non-excitation states of the solenoid-operated valve coils 208, 220 are clearly indicated.

The light emitting diode 212 may be connected to the output terminal OUT2, and the data outputted to the output terminal OUT1 may be made identical with the data outputted to the output terminal OUT2 (logical value of the bit 9 may be made identical with that of the bit 10). Accordingly, even when the solenoid-operated valve coil 208 is not connected, it is possible to know that the signal for driving the solenoid-operated valve coil 208 is outputted by the light emission of the light emitting diode 212, which is convenient when the maintenance is performed. Further, when the light emitting diode 206 does not emit light and the light emitting diode 212 emits light although the solenoid-operated valve coil 208 is supposed to be connected, then it is possible to know that the solenoid-operated valve coil 208 suffers from breaking of wire, which is convenient when the maintenance is performed.

The light emitting diode 224 may be connected to the output terminal OUT4, and the data outputted to the output terminal OUT3 may be made identical with the data outputted to the output terminal OUT4 (logical value of the bit 11 may be made identical with that of the bit 12). Accordingly, even when the solenoid-operated valve coil 220 is not connected, it is possible to know that the signal for driving the solenoid-operated valve coil 220 is outputted by the light emission of the light emitting diode 224, which is convenient when the maintenance is performed. Further, when the light emitting diode 218 does not emit light and the light emitting diode 224 emits light although the solenoid-operated valve coil 220 is supposed to be connected, then it is possible to know that the solenoid-operated valve coil 220 suffers from breaking of wire, which is convenient when the maintenance is performed.

Similarly, the output logical values of the output terminals OUT1 to OUT4 of the channels CH2, CH3, CH4 are determined by the logical values set in the bit 14 to the bit 17 of the sending data format, by the logical values set in the bit 19 to the bit 22, and by the logical values set in the bit 24 to the bit 27, respectively in the cited order. The solenoid-operated valve coil is controlled to be in the excitation or non-excitation state based on the logical value, and the light emission of the light emitting diodes 206, 212, 218, 224 is controlled in the same manner as in the case of the channel CH1. The operation is performed in the same manner as described above for the other communication control integrated circuits.

It is judged that the sending of the data at this time to the communication control integrated circuit 22 comes to an end by means of the bit 30 and the bit 31 of the sending data format.

Figure 7A:
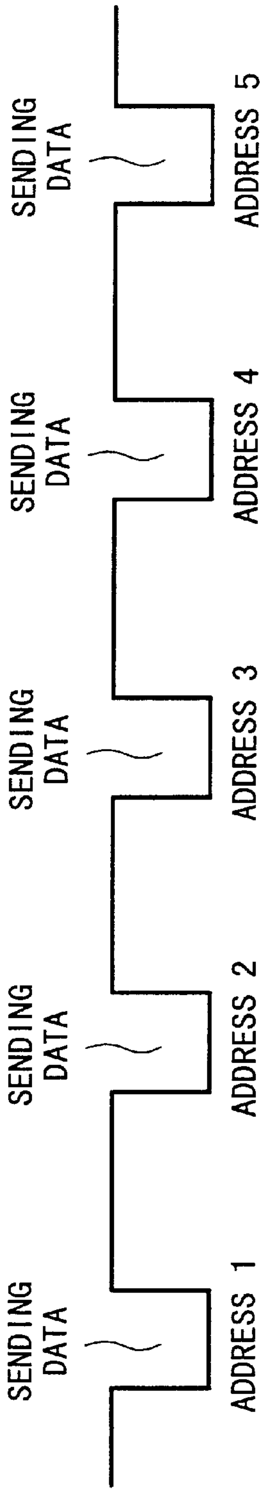
FIG. 7A illustrates timing for transmission data to be used for the method of driving and controlling the solenoid-operated valve according to the first embodiment of the present invention.

The foregoing description is illustrative of the case that the sending data designates the address of the communication control integrated circuit 22. However, as shown in FIG. 7A, the sending data is transmitted to other communication control integrated circuits having different addresses at predetermined intervals, for example, for an address 1, an address 2, an address 3, an address 4, an address 5 and so forth. When the sending data is received, the serial data is sent to the communication control circuit, for example, to the solenoid-operated valve driving control circuit 202 from the communication control integrated circuits 24-1, 24-2, 26-1, 26-2, 26-3, 26-4, 28.

Figures 9A, 9B:
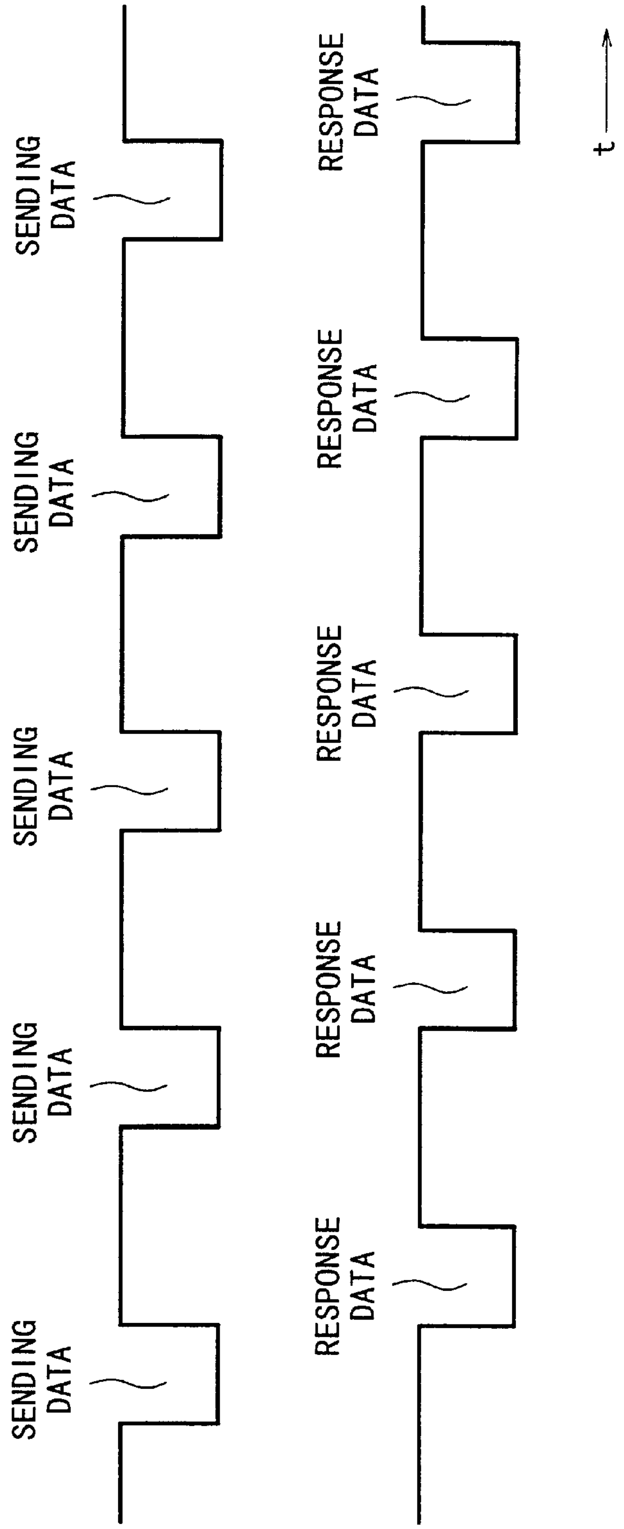
FIG. 9A illustrates timing for transmission data to the solenoid-operated valve driving control circuit to be used for the method of driving and controlling the solenoid-operated valve according to the first embodiment of the present invention.
FIG. 9B illustrates timing for response data from the solenoid-operated valve driving control circuit to be used for the method of driving and controlling the solenoid-operated valve according to the first embodiment of the present invention.

The opening/closing control data composed of serial data is successively transmitted to the solenoid-operated valve driving control circuit as shown in FIG. 9A from each of the channels CH of the communication control integrated circuits 22, 24-1, 24-2, 26-1, 26-2, 26-3, 26-4, 28 which have received the serial data from the solenoid-operated valve control bus 20.

The control is performed in accordance with the output from the solenoid-operated valve driving control circuit, for example, the solenoid-operated valve driving control circuit 202 which has received the opening/closing control data having a serial data structure. As a result, the open/closed data of the solenoid-operated valve indicating the open/closed state of the solenoid-operated valve detected by the sensors 248, 250 is supplied to the input terminals IN1, IN2. The data indicating whether the coil of the solenoid-operated valve has the double-coil structure or the single-coil structure is supplied to the input terminal S/D*. The open data and the closed data of the solenoid-operated valve and the data supplied to the input terminal S/D* are transmitted to the communication control integrated circuit as the response data as shown in FIG. 9B within a predetermined period after the sending serial data for controlling the solenoid-operated valve coil is transmitted.

The response data format of the response data transmitted from the solenoid-operated valve driving control circuit 202 to the communication control integrated circuit 22 is as shown in FIG. 8B. A bit 0 indicates a start bit, a bit 1 is the logical value of the output from the sensor 248 inputted into the input terminal IN1 of the channel CH1, and a bit 2 is the logical value of the output from the sensor 250 inputted into the input terminal IN2 of the channel CH1. A bit 3 is the logical value supplied to the input terminal S/D*, which is logical H in the case of the single-coil structure or which is logical L in the case of the double-coil structure. A bit 4 indicates a parity bit, and a bit 5 and a bit 6 are stop bits.

The response data sent from the solenoid-operated valve driving control circuit 202 to the communication control integrated circuit 22 is converted into serial data and sent to the communication control integrated circuit 22. This procedure is performed in the same manner as described above for the response data sent from the other solenoid-operated valve driving control circuits 202 to the corresponding other communication control integrated circuits 24-1, 24-2, 26-1, 26-2, 26-3, 26-4, 28. The sending timing is as shown in FIG. 9B. The data is sent with a delay of predetermined period from the sending serial data.

Figure 10A:
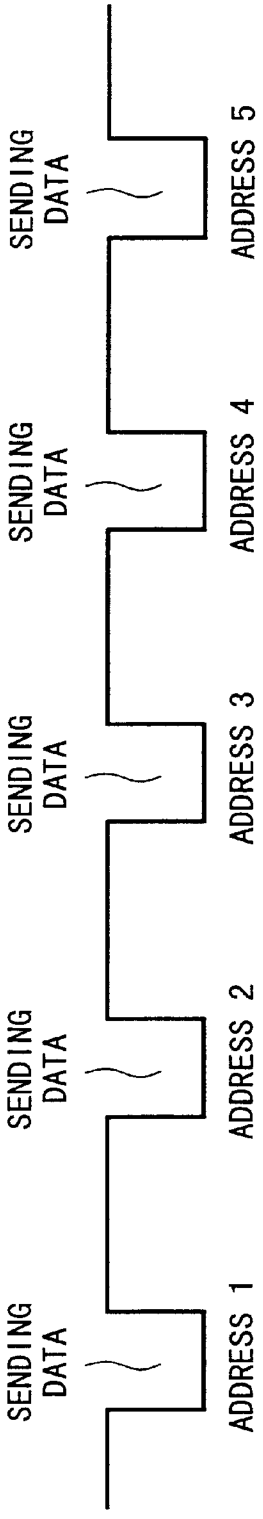
FIG. 10A illustrates timing for transmission data to the solenoid-operated valve driving control circuit to be used for the method of driving and controlling the solenoid-operated valve according to the first embodiment of the present invention.
Figure 10B:
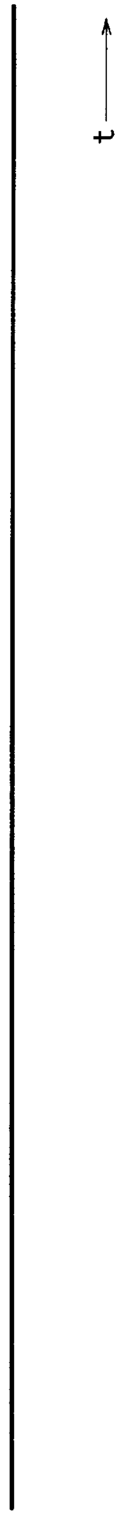
FIG. 10B illustrates timing for response data from the solenoid-operated valve driving control circuit to be used for the method of driving and controlling the solenoid-operated valve according to the first embodiment of the present invention.

The response data from the solenoid-operated valve driving control circuit 202, which is used when the solenoid-operated valve coil is not connected to the output terminals OUT1, OUT3 of the solenoid-operated valve driving control circuit 202, has the output of logical H as shown in FIG. 10B for the serial data shown in FIG. 10A. In this case, enables (ENABLES, bits 12, 17, 22, 27 in FIG. 6) in the response data shown in FIG. 6 as described later on are set to logical L. It is indicated that the solenoid-operated valve is not connected.

The response data having the serial data structure, which is outputted from the solenoid-operated valve driving control circuit 202 provided for the solenoid-operated valve 30, is transmitted to the channel CH1 of the communication control integrated circuit 22. The response data having the serial data structure, which is outputted from the solenoid-operated valve driving control circuit 202 provided for the solenoid-operated valve 32, is transmitted to the channel CH2 of the communication control integrated circuit 22. The response data having the serial data structure, which is outputted from the solenoid-operated valve driving control circuit 202 provided for the solenoid-operated valve 34, is transmitted to the channel CH3 of the communication control integrated circuit 22. The response data having the serial data structure, which is outputted from the solenoid-operated valve driving control circuit 202 provided for the solenoid-operated valve 36, is transmitted to the channel CH4 of the communication control integrated circuit 22.

Figure 7B:
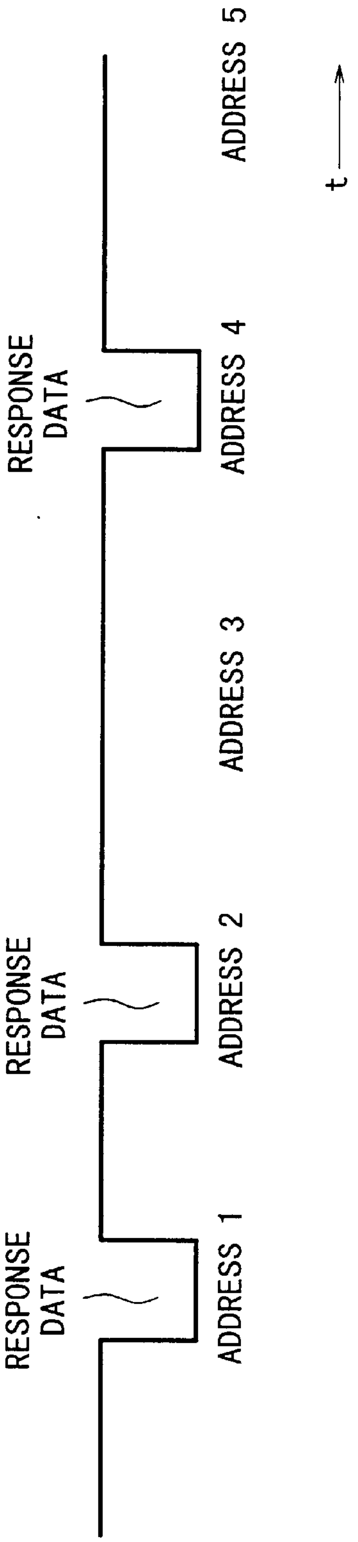
FIG. 7B illustrates timing for response data to be used for the method of driving and controlling the solenoid-operated valve according to the first embodiment of the present invention.

In the communication control integrated circuit 22 which has received the response data having serial data structure supplied to the channels CH1, CH2, CH3, CH4, the response data is converted into parallel data for each of the channels CH. The address data allotted to the communication control integrated circuit 22, the operation mode bit, the address mode parity bit, the enable bit and the parity bit for the serial data inputted from each channel CH, the judgment bit for the use of output or the use of input, and the stop bits are added to the converted parallel data to generate the parallel response data having the format shown in FIG. 6, then converted into serial data. A bit 0 through a bit 31 shown in FIG. 6 are successively sent to the solenoid-operated valve control bus 20. As shown in FIG. 7B, the response data from a bit 0 to a bit 31 is outputted and sent by a predetermined delay as compared with the transmission of the sending data shown in FIG. 7A. FIG. 7B is illustrative of the case that the solenoid-operated valve is not connected to the solenoid-operated valve driving control circuits which are connected to the communication control integrated circuits corresponding to the address 3 and the address 5.

In particular, as for the response data outputted from the communication control integrated circuit (see FIG. 6), the bit 0 indicates start bit. The bits 1 to 6 indicate respective address data for address data $2^0$, $2^1$, $2^2$, $2^3$, $2^4$, $2^5$. The bit 7 indicates an operation mode bit for indicating the response data from the communication control integrated circuit 22, 24, 26, 28 in the case of logical H or indicating the response data from the communication control integrated circuit 100 in the case of logical L. The bit 8 indicates address mode parity bit.

In FIG. 6, when the operation mode bit is logical H, the bit 9 to the bit 13 indicate the data supplied to the input terminal IN1, the input terminal IN2, and S/D* of the channel CH1, the data indicating whether or not the solenoid-operated valve is connected, and the parity data therefor, respectively. The bit 14 to the bit 18 indicate the data supplied to the input terminal IN1, the input terminal IN2, and S/D* of the channel CH2, the data indicating whether or not the solenoid-operated valve is connected, and the parity data therefor, respectively. The bit 19 to the bit 23 indicate the data supplied to the input terminal IN1, the input terminal IN2, and S/D* of the channel CH3, the data to indicate whether or not the solenoid-operated valve is connected, and the parity data therefor, respectively. The bit 24 to the bit 28 indicate the data supplied to the input terminal IN1, the input terminal IN2, and S/D* of the channel CH4, the data to indicate whether or not the solenoid-operated valve is connected, and the parity data therefor respectively. The bit 29 indicates a judgment bit for the use of input or the use of output. The bit 30 and the bit 31 indicate stop bits.

The gateway 15, which has received the output serial data of the response data format shown in FIG. 6 outputted from the communication control integrated circuit 22, converts the data format based on the protocol, and the data is outputted via the field bus 14.

If the operation mode bit (bit 7) is logical L, then the parity bit based on the arithmetic operation result is added for every 4 bits as shown in right columns in FIG. 6 to the signal data from the sensor inputted into the communication control integrated circuit 100 for the bit 9 to the bit 28. The bit 29, the bit 30, and the bit 31 are further added, and the data is transmitted to the solenoid-operated valve control bus 20.

As described above, according to the method of driving and controlling the solenoid-operated valve concerning the first embodiment of the present invention, the opening/closing operations of the plurality of solenoid-operated valves can be controlled based on the data sent from the gateway 15 via the solenoid-operated valve control bus 20 by using the output of the solenoid-operated valve driving control circuit 202 which receives the signals from the communication control integrated circuits 22, 24-1, 24-2, 26-1, 26-2, 26-3, 26-4, 28. Further, the signals indicating the open/closed states of the plurality of solenoid-operated valves based on the control from the solenoid-operated valve driving control circuit 202 are sent to the gateway 15 via the solenoid-operated valve control bus 20 for receiving the signals from the communication control integrated circuits 22, 24-1, 24-2, 26-1, 26-2, 26-3, 26-4, 28. The open/closed state of the solenoid-operated valve is managed based on the data.

Further, the response data based on the output of the sensor inputted into the communication control integrated circuit 100 is also sent to the gateway 15 via the solenoid-operated valve control bus 20. The signal of the sensor outputted to the communication control integrated circuit 100 can be also managed based on the data.

Figure 11:
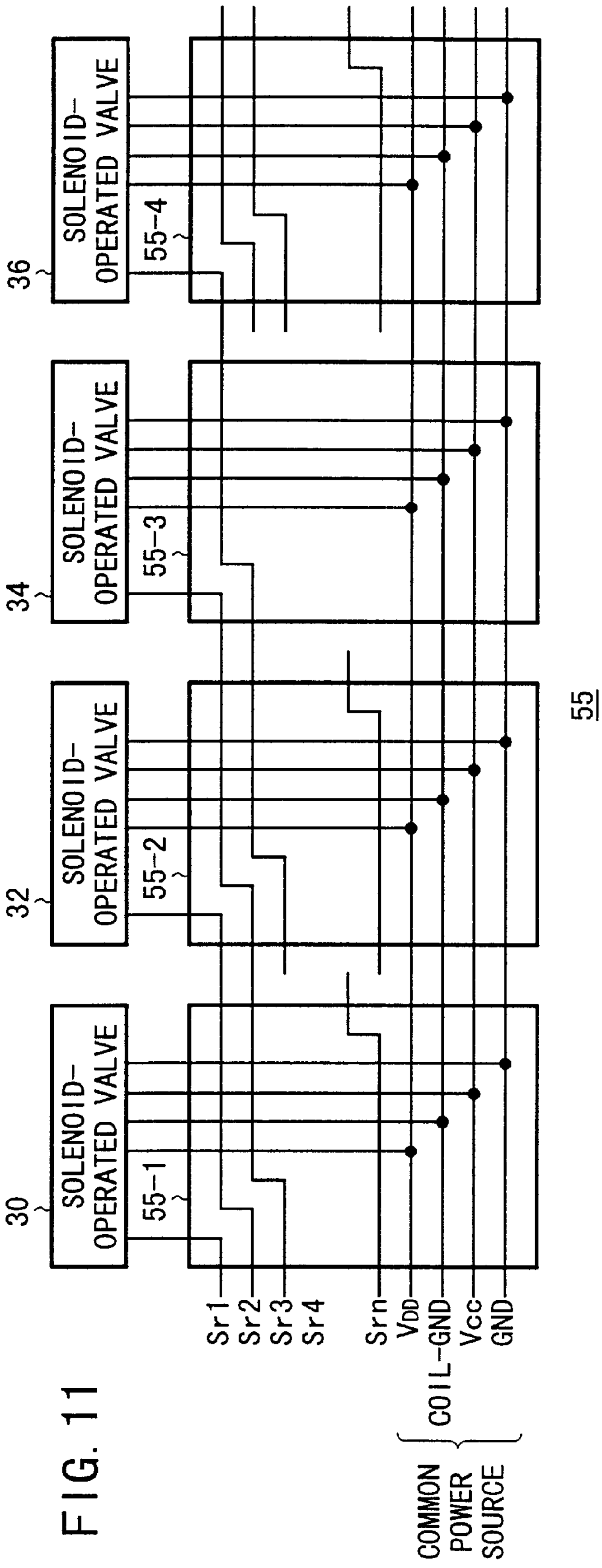
FIG. 11 shows a manifold configuration used in the method of driving and controlling the solenoid-operated valve according to the first embodiment of the present invention.

As described above, the solenoid-operated valve is provided with the communication control integrated unit 200 which includes the solenoid-operated valve driving control circuit 202. As shown in FIG. 11, the interconnection is made with first connectors to construct a manifold 55, the solenoid-operated valves 30, 32, 34, 36, . . . are individually installed to second connectors of manifold segments 55-1, 55-2, 55-3, 55-4, . . . of the manifold 55 to drive and control the solenoid-operated valves 30, 32, 34, 36, . . . by the first connectors and the second connectors. Then, it is enough to use, for each of the solenoid-operated valves 30, 32, 34, 36, . . . , each one of electrical conductive passage Sr1, Sr2, Sr3, Sr4 for wiring to drive and control the solenoid-operated valves 30, 32, 34, 36, . . . , in addition to a common power source and a ground line. The electrical conductive passage Sr1, Sr2, Sr3, Sr4 introduces the serial data from one output terminal OUT of the communication control integrated circuit to each of the solenoid-operated valves as shown in FIG. 11, irrelevant to the single-coil structure and the double-coil structure of the coil of the solenoid-operated valve.

Therefore, even when it is necessary to exchange the solenoid-operated valve having the double-coil structure with the solenoid-operated valve having the single-coil structure, or even when it is necessary to exchange the solenoid-operated valve having the single-coil structure with the solenoid-operated valve having the double-coil structure, then it is enough to exchange only the solenoid-operated valve to be installed to the manifold segment. This procedure is successfully performed by switching the switch 252 for the solenoid-operated valve. It is also unnecessary to change wiring. It is also unnecessary to change the substrate of the connector section. Further, it is also unnecessary to exchange the manifold segment. It is also easy to respond to the change of the design of the automatic assembling system.

Figures 12A, 12B:
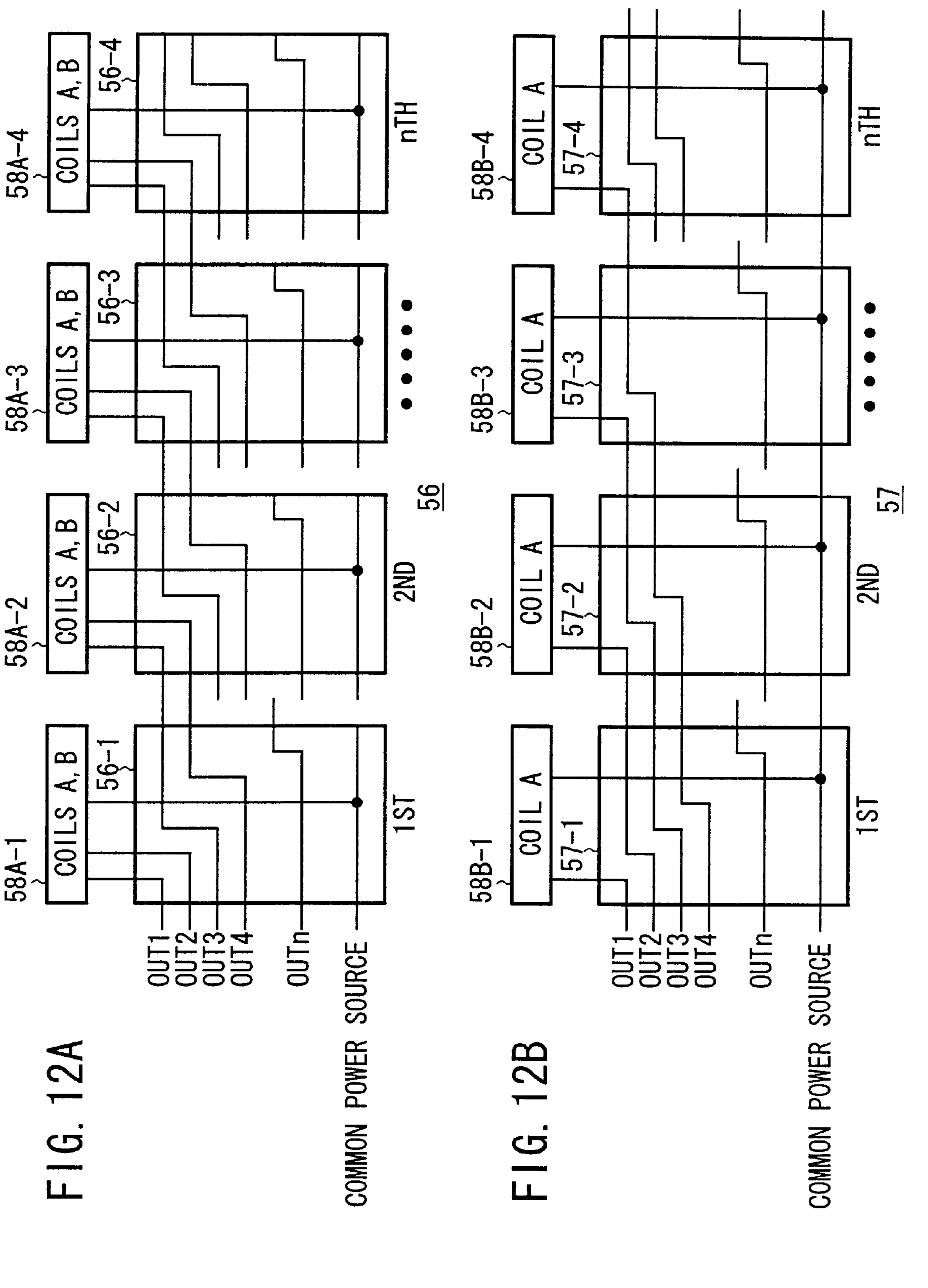
FIG. 12A illustrates a manifold configuration used in a conventional method of driving and controlling a solenoid-operated valve, depicting a case that the solenoid-operated valve has a double-coil structure.
FIG. 12B illustrates a manifold arrangement used in a conventional method of driving and controlling a solenoid-operated valve, depicting a case that the solenoid-operated valve has a single-coil structure.

On the contrary, in the case of the conventional technique, when solenoid-operated valves having the double-coil structure are used as shown in FIG. 12A, then the interconnection is made with an electrical conductive passage for the power source (indicated by "COMMON POWER SOURCE") in addition to two electrical conductive passages for supplying solenoid-operated valve coil-driving signals to respective manifold segments 56-1, 56-2, 56-3, 56-4, . . . of a manifold 56. The solenoid-operated valves 58A-1, 58A-2, 58A-3, 58A-4 each having a double-coil structure are individually installed to the manifold segments 56-1, 56-2, 56-3, 56-4, . . . , respectively.

Further, in the case of the conventional technique, when solenoid-operated valves having the single-coil structure are used as shown in FIG. 12B, then the interconnection is made with an electrical conductive passage for the power source (indicated by "COMMON POWER SOURCE") in addition to single electrical conductive passages for supplying solenoid-operated valve coil-driving signals to respective manifold segments 57-1, 57-2, 57-3, 57-4, . . . of a manifold 57, and the solenoid-operated valves 58B-1, 58B-2, 58B-3, 58B-4 each having a single-coil structure are individually installed to the manifold segments 57-1, 57-2, 57-3, 57-4, . . . , respectively.

Therefore, when the solenoid-operated valve having the double-coil structure should be exchanged with the solenoid-operated valve having the single-coil structure for a part of the solenoid-operated valves in the case of FIG. 12A, or when the solenoid-operated valve having the single-coil structure should be exchanged with the solenoid-operated valve having the double-coil structure for a part of the solenoid-operated valves in the case of FIG. 12B, then it is necessary to change the manifold segment of the manifold. For this reason, it is necessary to prepare two types of substrates for constructing the single-coil structure and for constructing the double-coil structure for the first and second connectors. Further, it is necessary to perform not only the exchange of the solenoid-operated valve but also the exchange of the substrate. Therefore, the working operation for the change is not easy.

Figure 13:
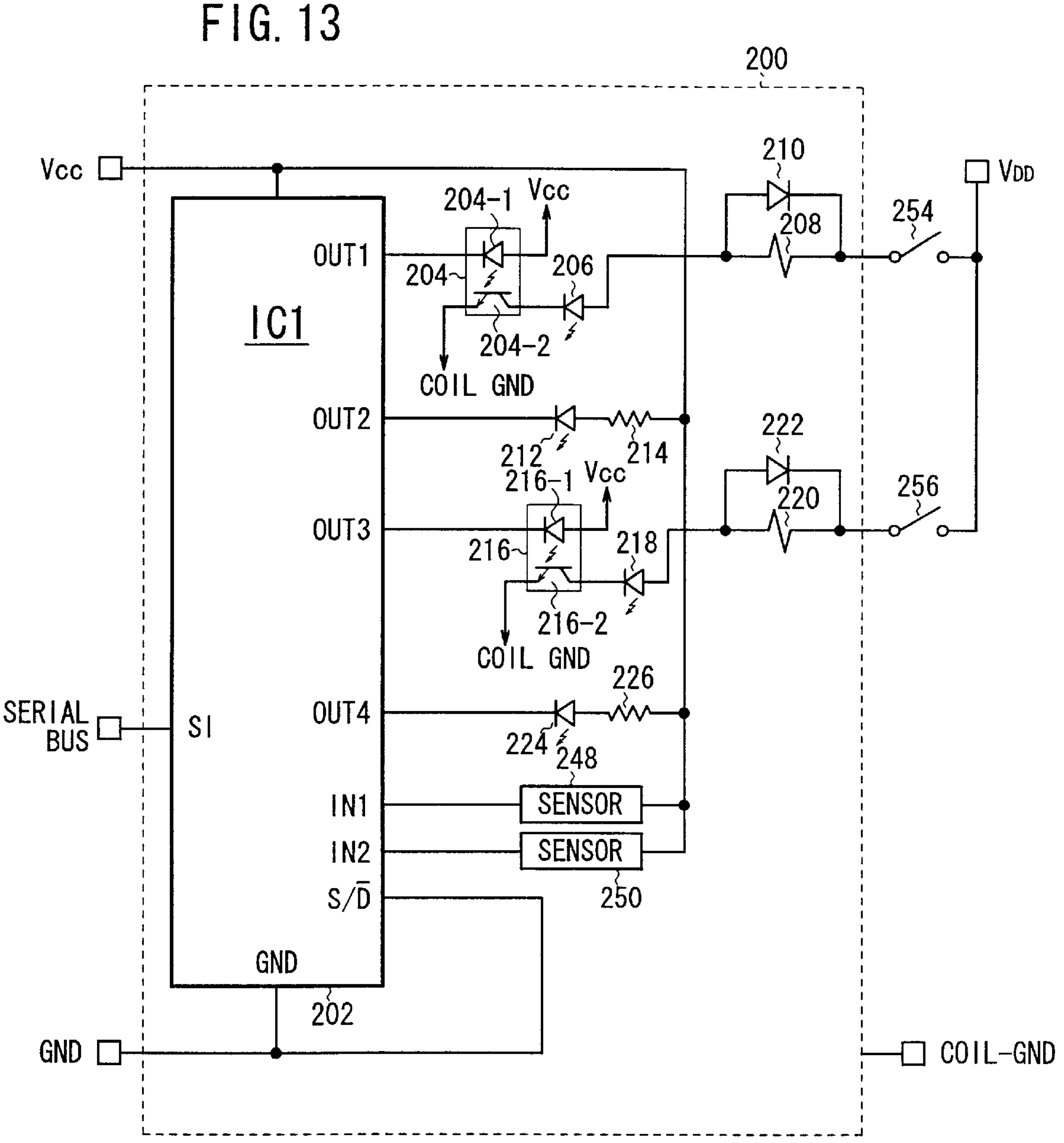
FIG. 13 illustrates that external interlock is provided for driving a solenoid-operated valve coil in the method of driving and controlling the solenoid-operated valve according to the first embodiment of the present invention.

Next, a first modified embodiment of the first embodiment of the present invention is shown in FIG. 13. In this case, in the communication control integrated unit 200, the power source $V_{DD}$ is applied to the solenoid-operated valve coil 208 by an external switch 254, and the power source $V_{DD}$ is applied to the solenoid-operated valve coil 220 by an external switch 256, making it possible to effect the interlock with the external switches 254, 256 as well.

Figure 14:
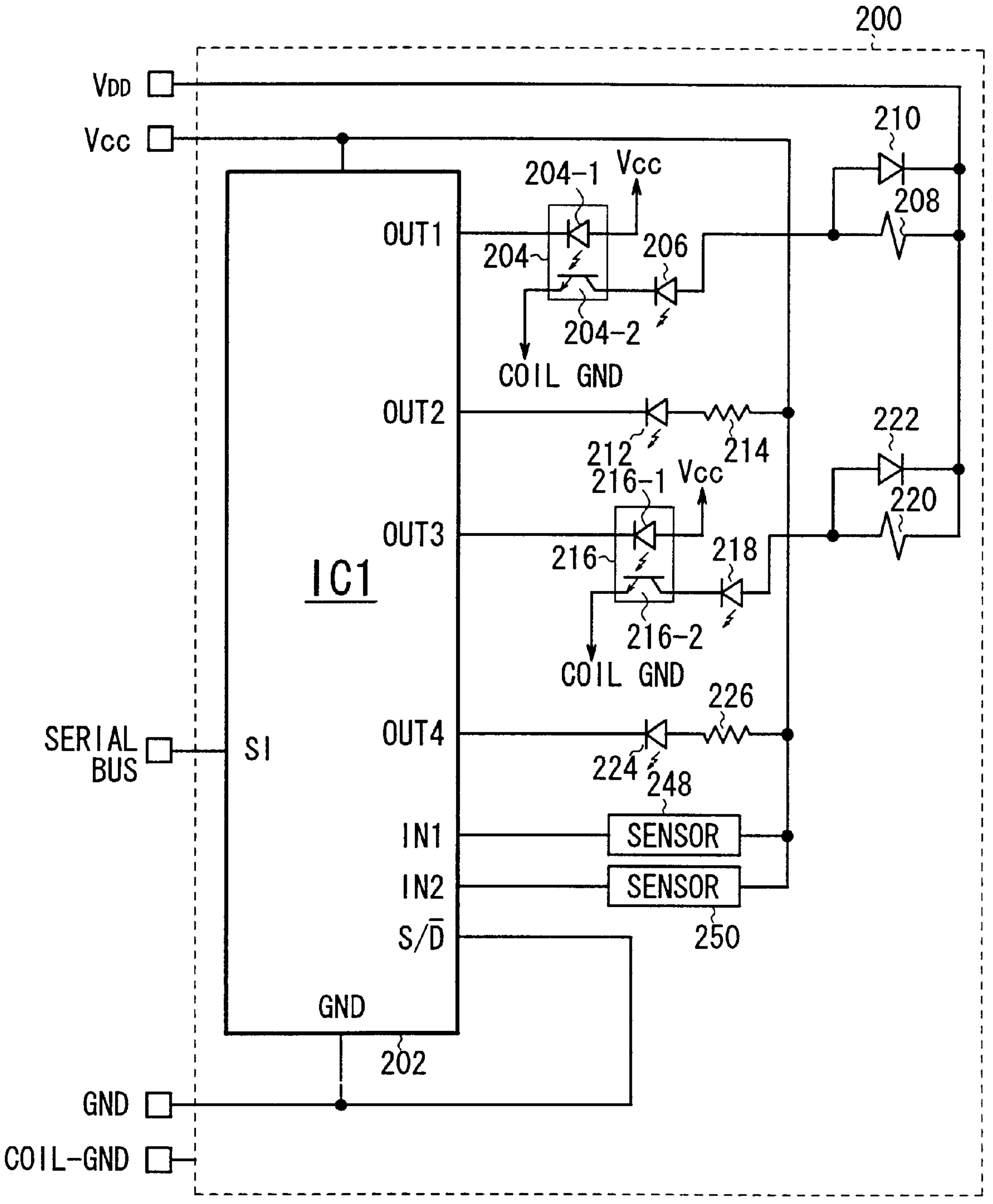
FIG. 14 illustrates a system to be exclusively used for a solenoid-operated valve having a double-coil structure in the method of driving and controlling the solenoid-operated valve according to the first embodiment of the present invention.

Alternatively, a second modified embodiment of the first embodiment of the present invention is shown in FIG. 14. In this case, the input terminal S/D* of the solenoid-operated valve driving control circuit 202 shown in FIG. 3 is pulled down to the ground, thereby making it possible to be exclusively used for the solenoid-operated valve having the double-coil structure as well.

Figure 15:
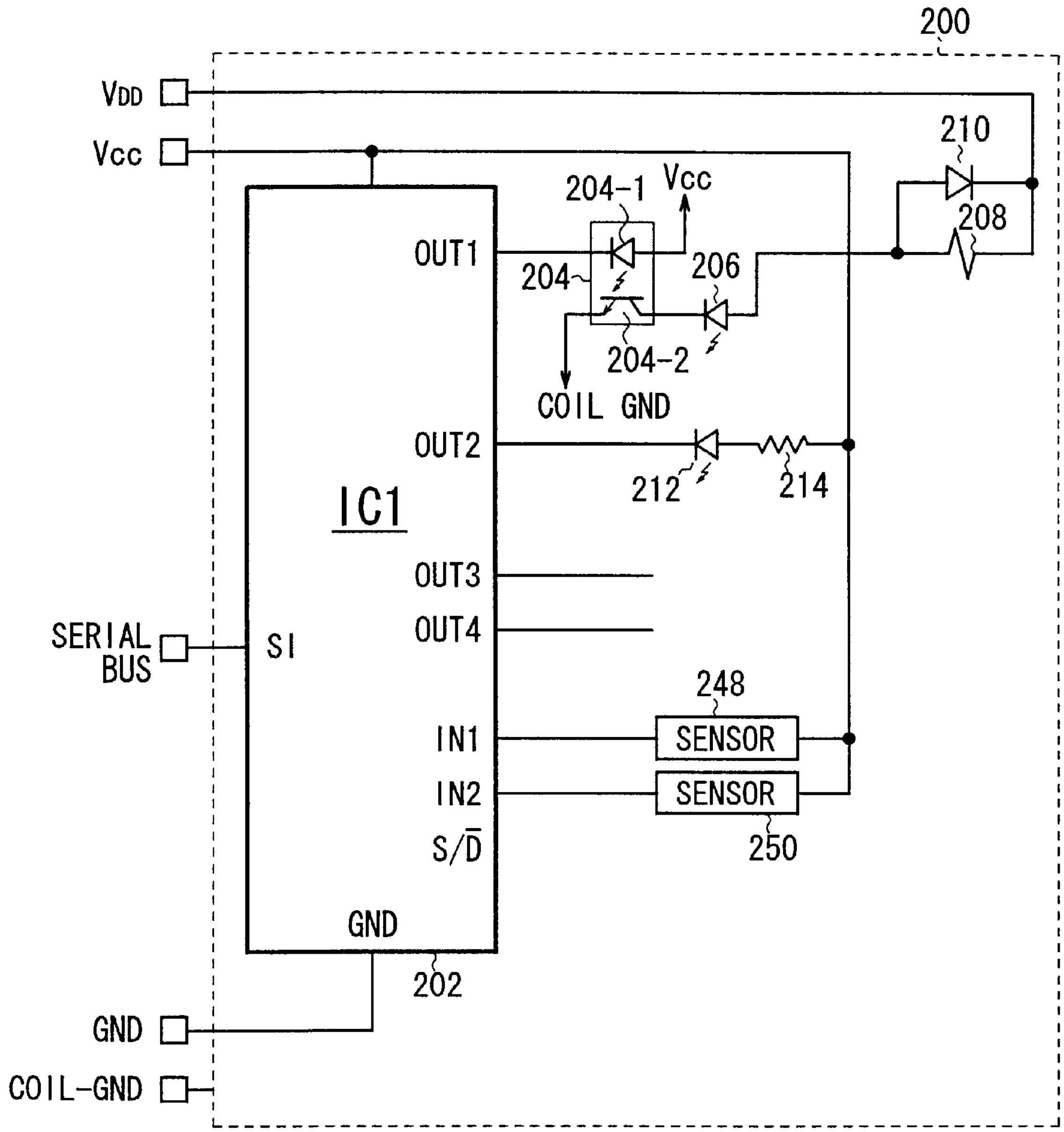
FIG. 15 illustrates a system to be exclusively used for a solenoid-operated valve having a single-coil structure in the method of driving and controlling the solenoid-operated valve according to the first embodiment of the present invention.

Alternatively, a third modified embodiment of the first embodiment of the present invention is shown in FIG. 15. In this case, the output terminals OUT3, OUT4 of the solenoid-operated valve driving control circuit 202 are opened, and the input terminal S/D* is opened, thereby making it possible to be exclusively used for the solenoid-operated valve having the single-coil structure as well.

Figure 16:
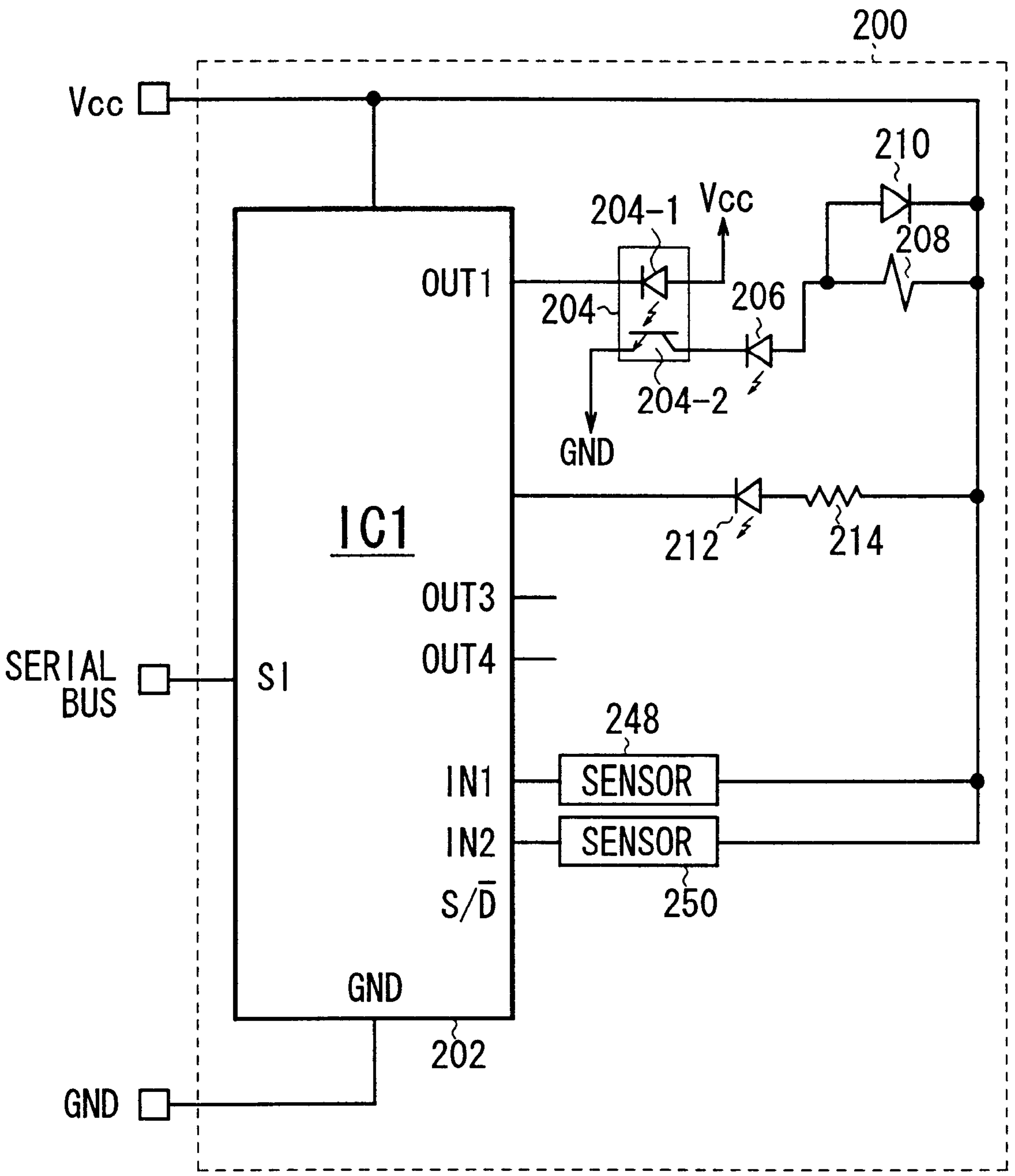
FIG. 16 illustrates a system to be exclusively used for a solenoid-operated valve having a single-coil structure wherein a power source is commonly used for a solenoid-operated valve driving control circuit and a solenoid-operated valve coil in the method of driving and controlling the solenoid-operated valve according to the first embodiment of the present invention.

When a common power source is used for the power source for the solenoid-operated valves and the power source for the solenoid-operated valve driving control circuit 202, a fourth modified embodiment of the first embodiment of the present invention shown in FIG. 16 is available. In this case, in the communication control integrated unit 200, the power source $V_{DD}$ and the power source $V_{CC}$ are common, and the ground is also common to the coil ground. FIG. 16 is illustrative of the case to be exclusively used for the solenoid-operated valve having the single-coil structure.

Figure 17:
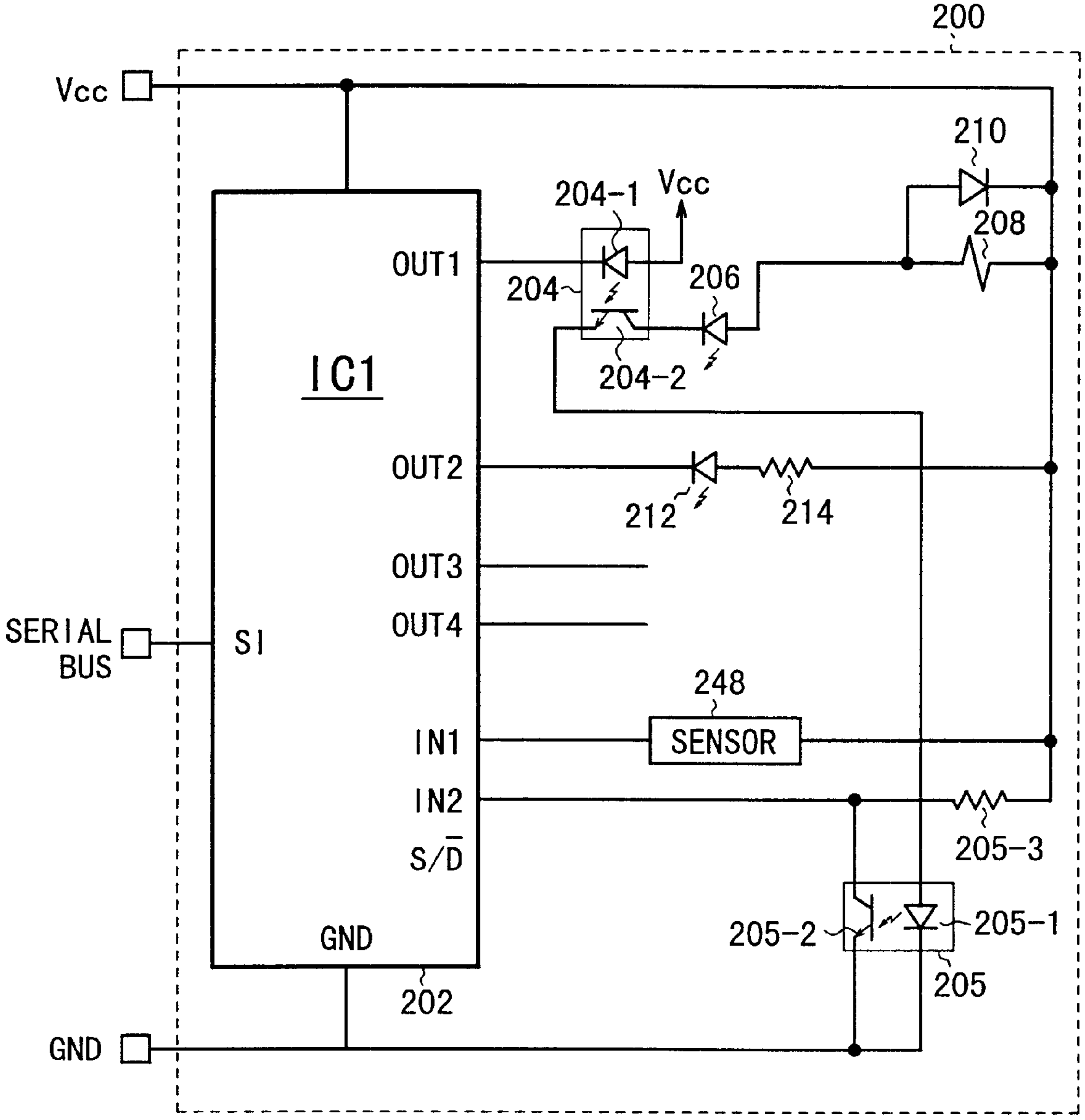
FIG. 17 illustrates a system to be exclusively used for a solenoid-operated valve having a single-coil structure wherein a power source is commonly used for a solenoid-operated valve driving control circuit and a solenoid-operated valve coil and wire breaking of the solenoid-operated valve coil is detected in the method of driving and controlling the solenoid-operated valve according to the first embodiment of the present invention.

Alternatively, a fifth modified embodiment of the first embodiment of the present invention shown in FIG. 17 may be adopted for the solenoid-operated valve driving control circuit shown in FIG. 16. In this case, the light emitting diode 205-1 of the photocoupler 205 is driven by the output of the phototransistor 204-2 of the interface circuit. The voltage of the power source $V_{CC}$ is applied to the phototransistor 205-2 of the photocoupler 205 through a resistor 205-3, and the light emission of the light emitting diode 205-1 is received by the phototransistor 205-2. The collector output of the phototransistor 205-2 is supplied to the input terminal IN2 of the solenoid-operated valve driving control circuit 202 in place of the output of the sensor 250. In this configuration, the photocoupler 205 functions as a sensor for detecting whether or not the solenoid-operated valve coil 208 suffers from wire breaking.

In such an arrangement, the light emitting diode 205-1 is driven to emit light if the solenoid-operated valve coil 208 is normal upon the driving by the photocoupler 204. Then, the phototransistor 205-2 is controlled to be in the ON state, and the signal indicating that the solenoid-operated valve coil 208 is normal is transmitted to the solenoid-operated valve driving control circuit 202 via the input terminal IN2. Therefore, it is possible to know that the solenoid-operated valve coil 208 is normal on the PLC 12.

If the solenoid-operated valve coil 208 suffers from wire breaking or contact failure upon the driving by the photocoupler 204, the light emitting diode 205-1 is not driven. The phototransistor 205-2 is controlled to be in the OFF state, and the signal indicating that the solenoid-operated valve coil 208 suffers from wire breaking is transmitted to the solenoid-operated valve driving control circuit 202 via the input terminal IN2. Therefore, it is possible to know the fact that the solenoid-operated valve coil 208 suffers from wire breaking on the PLC 12.

The modified embodiment described above is illustrative of the case that the output of the phototransistor 205-2 is supplied to the input terminal IN2 of the solenoid-operated valve driving control circuit 202. However, the following configuration may be available. That is, the output of the sensor 250 is supplied to the input terminal IN2 of the solenoid-operated valve driving control circuit 202. An input terminal IN3 is newly provided for the solenoid-operated valve driving control circuit 202. The output of the phototransistor 205-2 may be supplied to the input terminal IN3.

Alternatively, a resistor may be connected in place of the photocoupler 205. The voltage drop based on the current flowing through the resistor may be applied to the input terminal IN2 or the newly provided input terminal IN3 described above. In this case, the resistor functions as a short circuit sensor for the solenoid-operated valve coil 208.

When the arrangement as described above is adopted, the current based on the driving current of the solenoid-operated valve coil 208 flows through the resistor. The voltage drop of the resistor, which is brought about by the electric power application when the solenoid-operated valve coil 208 forms the short circuit, is logical H. It is possible to know that the solenoid-operated valve coil 208 suffers from the short circuit on the PLC 12.

Further, when an input terminal IN4 is provided, it is possible to apply also to the case of the solenoid-operated valve coil having the double-coil structure.

Figure 18:
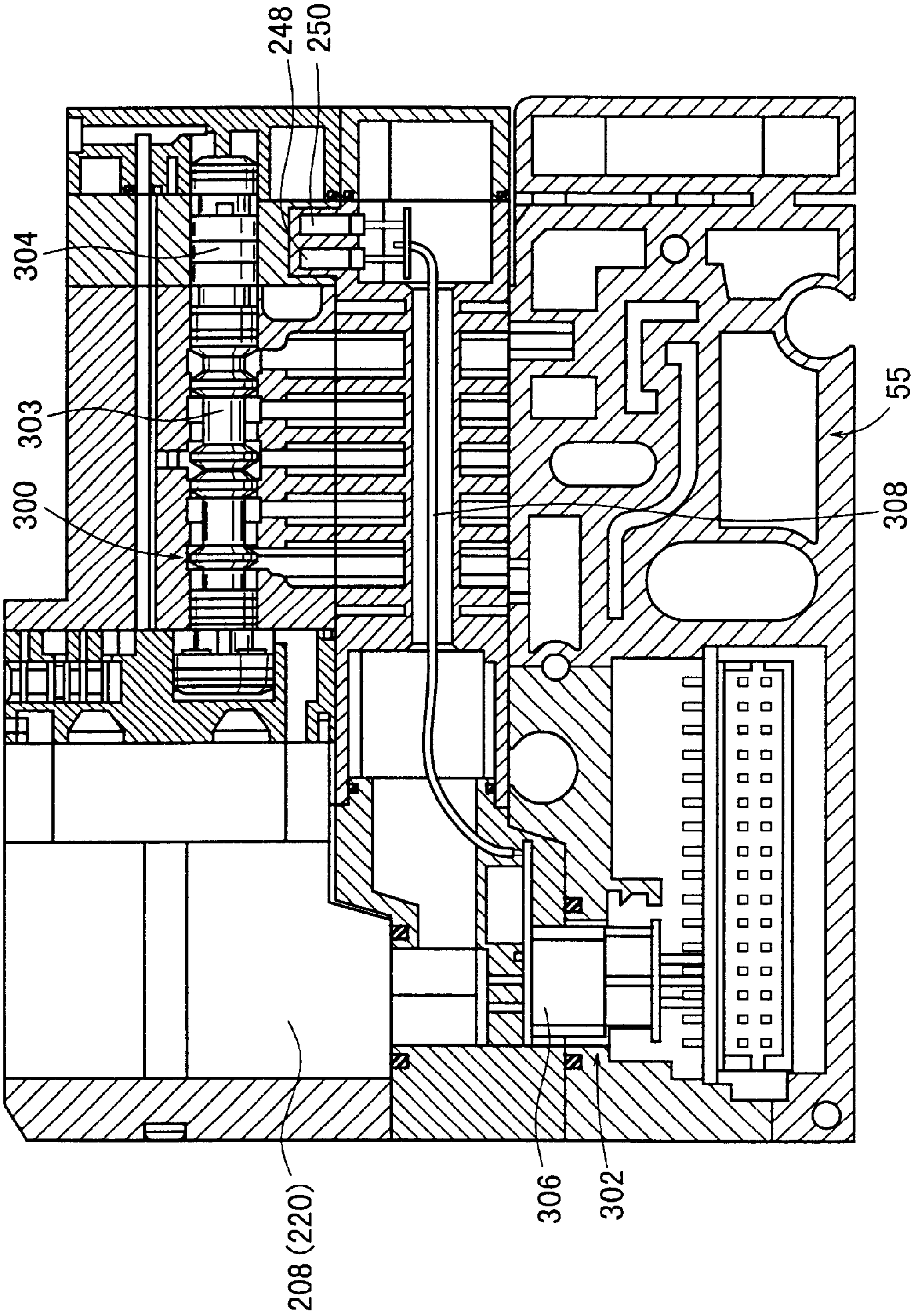
FIG. 18 shows a vertical sectional view illustrating the solenoid-operated valve to be used for the method of driving and controlling the solenoid-operated valve according to the first embodiment of the present invention.

Next, FIG. 18 shows a vertical sectional view illustrating the solenoid-operated valve to be used for the method of driving and controlling the solenoid-operated valve according to the first embodiment of the present invention.

The solenoid-operated valve comprises a solenoid-operated valve unit 300, the manifold 55, and a control unit 302 integrally connected to one another. The solenoid-operated valve unit 300 is arranged with the solenoid-operated valve coil 208 (220). The solenoid-operated valve coil 208 (220) is provided such that the solenoid-operated valve coil having the single-coil structure and the solenoid-operated valve coil having the double-coil structure are easily exchangeable by using unillustrated screw members.

The solenoid-operated valve unit 300 is provided with the spool valve 303 which is displaceable substantially in the horizontal direction in accordance with the exciting action of the solenoid-operated valve coil 208 (220). The open state or the closed state of the spool valve 303 is detected by the sensors 248, 250 for detecting the magnetic field of the magnet ring 304 installed to one end thereof.

An integrated circuit 306 including the solenoid-operated valve driving control circuit 202 is arranged under the solenoid-operated valve unit 300. Detection signals from the sensors 248, 250 are introduced into the integrated circuit 306 via a lead wire 308.

Next, explanation will be made for a method of driving and controlling a solenoid-operated valve according to a second embodiment of the present invention.

The solenoid-operated valve, to which the method of driving and controlling the solenoid-operated valve according to the second embodiment of the present invention is applied, is illustrative of a case of three-position solenoid-operated valve, i.e., a solenoid-operated valve is at the open position when the first solenoid-operated valve coil is excited, at the closed position when the second solenoid-operated valve coil is excited, and at the intermediate position when no electric power is applied to both of the solenoid-operated valve coils.

The system configuration of the driving control apparatus for the solenoid-operated valve to which the method of driving and controlling the solenoid-operated valve according to the second embodiment of the present invention is the same as the system configuration of the driving and controlling apparatus 10 for the solenoid-operated valve according to the first embodiment of the present invention shown in FIGS. 1 and 2. The system comprises a PLC 12, a field bus 14, a gateway 15, a solenoid-operated valve control bus 20, communication control integrated circuits 22, 24-1, 24-2, 26-1, 26-2, 26-3, 26-4, 28, and a communication control integrated circuit 100 for receiving the output data from external sensors 101 to 116. The respective solenoid-operated valves 30, 32, 34, 36, 40, 42, 44, 46, 48, 50, 52, 54, 60, 62, 64, 66, 68, 70, 72, 74, 76, 78, 80, 82, 84, 86, 88, 90, 92, 94, 96, 98 are controlled to be at the open, closed, and intermediate positions in accordance with the solenoid-operated valve control data outputted from the communication control integrated circuits 22, 26, 28, and the state signals from the respective solenoid-operated valves are transmitted to the communication control integrated circuits 22, 24-1, 24-2, 26-1, 26-2, 26-3, 26-4, 28. Details of the system configuration and the function thereof are the same as those of the driving and controlling apparatus 10 for the solenoid-operated valve, so that detailed explanation will be omitted in order to avoid any duplicated description.

In the driving control apparatus for the solenoid-operated valve to which the method of driving and controlling the solenoid-operated valve according to the second embodiment of the present invention is applied, a communication control integrated unit 200-1 shown in FIG. 19 described later on is used in place of the communication control integrated unit 200 shown in FIG. 3.

The communication control integrated unit 200-1 is provided for each of the solenoid-operated valves in the same manner as the communication control integrated unit 200. The communication control integrated unit 200-1 is provided with a solenoid-operated valve driving control circuit 202-1. The communication control integrated unit 200-1 and the solenoid-operated valve driving control circuit 202-1 are the identical configuration for all of the respective solenoid-operated valves. Therefore, only the communication control integrated unit 200-1 provided for each solenoid-operated valve 30 will be explained with reference to FIG. 19, and only the solenoid-operated valve driving control circuit 202-1 will be explained with reference to FIG. 20.

Figure 20:
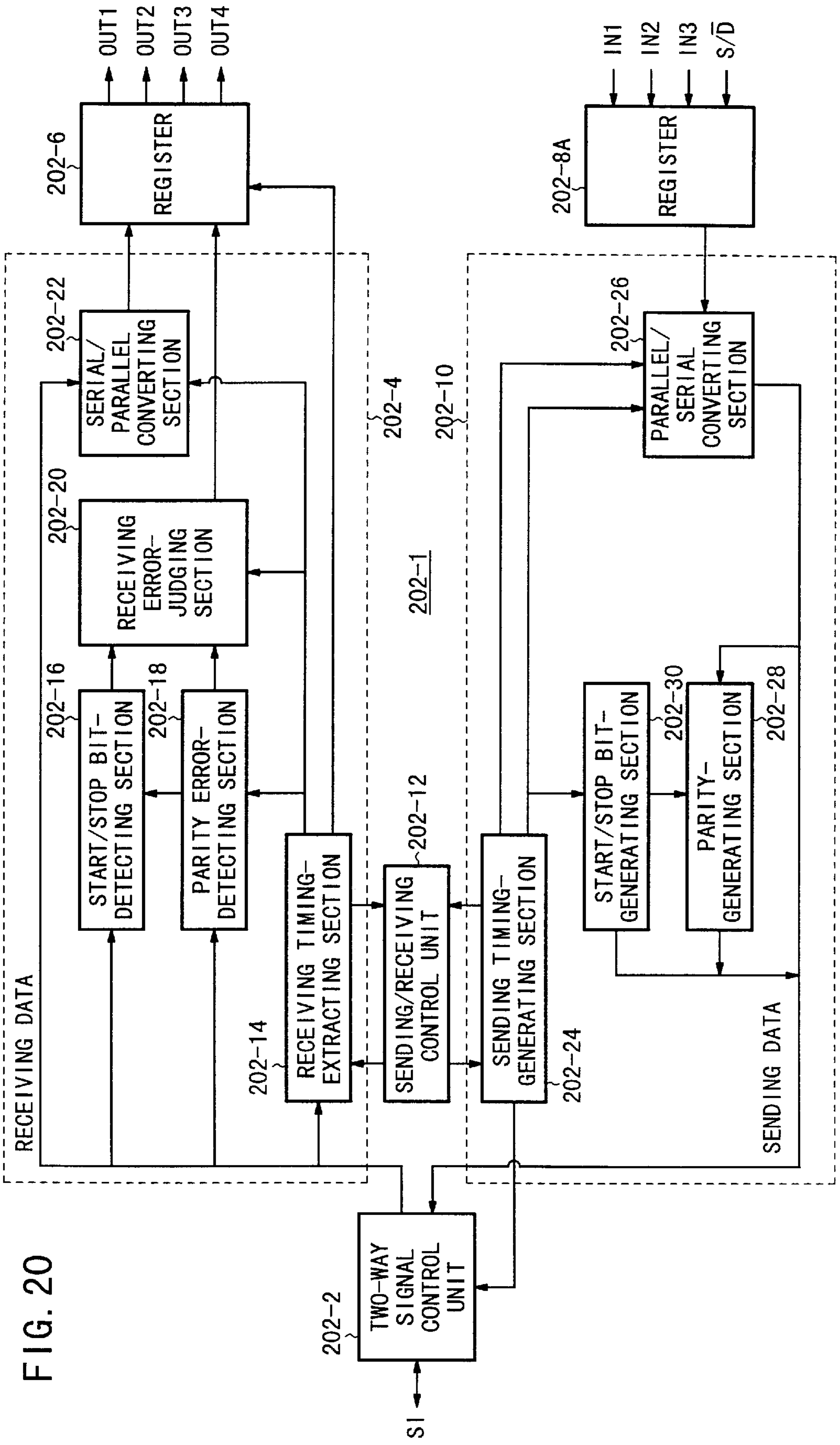
FIG. 20 is a block diagram illustrating the solenoid-operated valve driving control circuit to be used for the method of driving and controlling the solenoid-operated valve according to the second embodiment of the present invention.

As shown in FIG. 20, the solenoid-operated valve driving control circuit 202-1 is constructed in the same manner as the solenoid-operated valve driving control circuit 202 and comprises a two-way signal control unit 202-2, a serial data-receiving unit 202-4, an output data register unit 202-6, an input data register unit 202-8A for receiving inputs from input terminals IN1, IN2, IN3, S/D*, a serial data-sending unit 202-10 and a sending/receiving control unit 202-12. The serial data-sending unit 202-10 receives the data of the input data register unit 202-8A and sends serial data by the two-way signal control unit 202-2. The sending/receiving control unit 202-12 controls start and end of receiving of the serial data-receiving unit 202-4 and controls start and end of sending of the serial data-sending unit 202-10.

In this configuration, the solenoid-operated valve driving control circuit 202-1 is different from the solenoid-operated valve driving control circuit 202 only in that the solenoid-operated valve driving control circuit 202-1 includes the input data register unit 202-8A having the input terminal IN3 in place of the input data register unit 202-8. The other components are not changed. The input data register unit 202-8A receives the inputs from the input terminals IN1, IN2, IN3, S/D* to make conversion into serial data.

Figure 19:
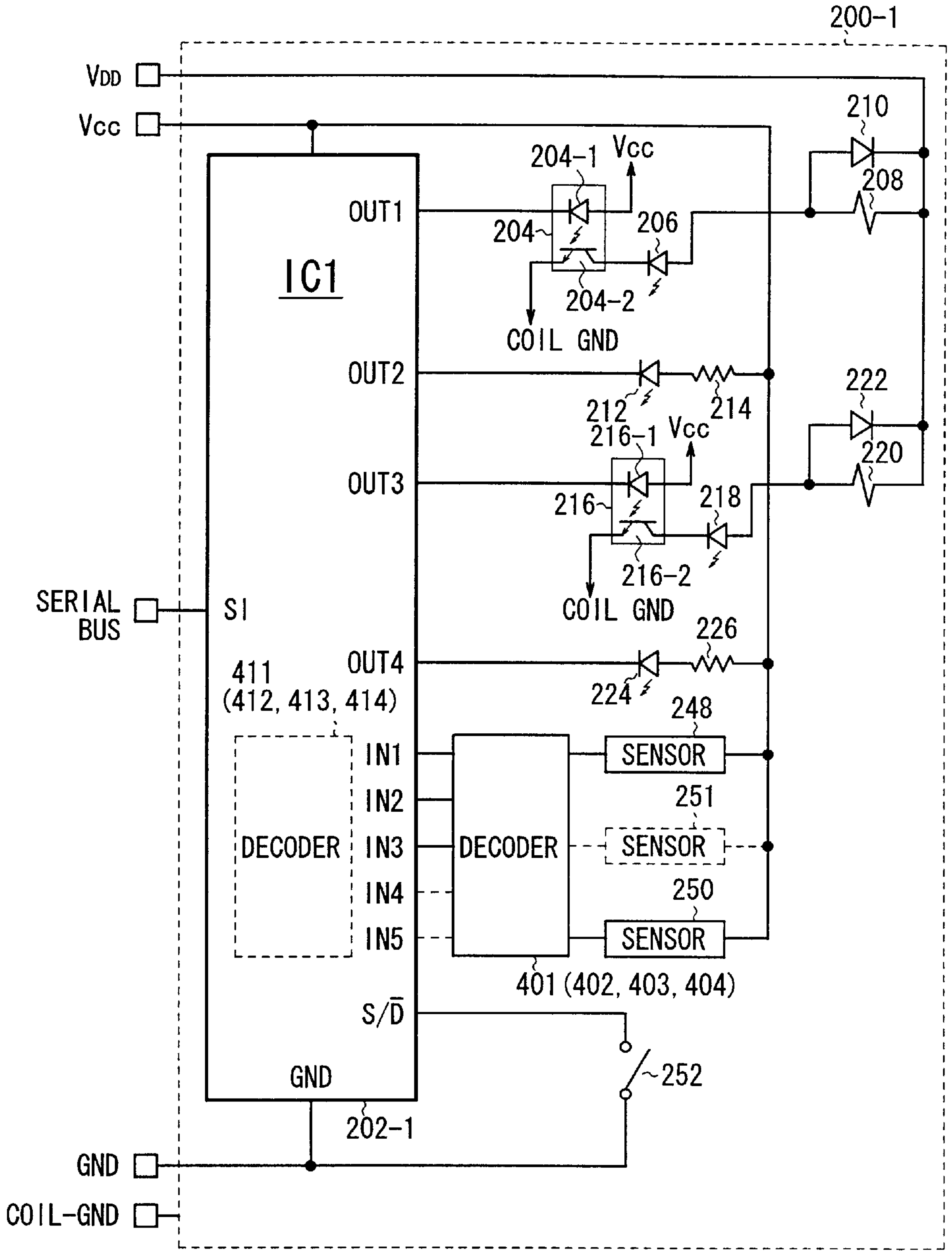
FIG. 19 illustrates a solenoid-operated valve driving control circuit to be used for a method of driving and controlling a solenoid-operated valve according to a second embodiment of the present invention.

The solenoid-operated valve driving control circuit 202-1 receives the serial data outputted from the channel CH1 of the communication control integrated circuit to make conversion into parallel data to be outputted to the terminals OUT1 to OUT4 as shown in FIG. 19. The excitation and the non-excitation of the solenoid-operated valve coils 208, 220 are individually controlled depending on the outputs of the output terminals OUT1 and OUT3. On the other hand, the solenoid-operated valve driving control circuit 202-1 receives, at the sensor input terminals IN1, IN2, IN3 and the input terminal S/D*, the signals for detecting the open, closed, or intermediate position of the solenoid-operated valve detected by the sensors 248, 250 (and/or a sensor 251) and the judgment signals for indicating whether the solenoid-operated valve has the single-coil structure or the double-coil structure by being selectively grounded by the switch 252 to perform parallel/serial conversion. The signals for detecting the positions of the valve are decoded by decoders 401, 402, 403, or 404 before entering the sensor input terminals IN1, IN2, IN3. The serial data is transmitted to the communication control integrated circuit 22.

In particular, the output data supplied from the output terminal OUT1 of the solenoid-operated valve driving control circuit 202-1 is applied to the solenoid-operated valve coil 208 via a light emitting diode 206 and a photocoupler 204 comprising a phototransistor 204-2 and a light emitting diode 204-1 for interface in order to drive the solenoid-operated valve coil 208. The output data supplied from the output terminal OUT3 of the solenoid-operated valve driving control circuit 202-1 is applied to the solenoid-operated valve coil 220 via a light emitting diode 218 and a photocoupler 216 comprising a phototransistor 216-2 and a light emitting diode 216-1 for interface in order to drive the solenoid-operated valve coil 220.

The reason why the photocouplers 204, 216 are provided is that it is intended to electrically isolate the output voltage of the solenoid-operated valve driving control circuit 202-1 from the voltage to be applied to the solenoid-operated valve coils 208, 220. In place of the photocoupler 204, 216, a relay may be used provided that there is enough operation time. The reason why the light emitting diodes 206, 218 are connected is that it is intended to visually judge whether or not the instruction of excitation is given to the solenoid-operated valve coil 208, 220. The diodes 210, 222 connected to the solenoid-operated valve coils 208, 220 in parallel are diodes for the snubber operation.

The light emitting diode 212 is driven with the output from the output terminal OUT2 of the solenoid-operated valve driving control circuit 202-1 by using the current restricted by a resistor 214. The light emitting diode 224 is driven with the output from the output terminal OUT4 of the solenoid-operated valve driving control circuit 202-1 by using the current restricted by a resistor 226. The reason why this configuration is adopted is as follows. That is, the light emitting diodes 212, 224 are driven based on the outputs of the output terminals OUT2, OUT4 even in a state that the solenoid-operated valve coils 208, 220 are not connected, so that the maintenance may be easily performed.

When the solenoid-operated valve has the double-coil structure, as shown in FIG. 19, the photocoupler 204, the solenoid-operated valve coil 208, the light emitting diodes 206, 212, the resistor 214, and the diode 210, which are driven by the outputs from the output terminals OUT1, OUT2 of the solenoid-operated valve driving control circuit 202-1, are connected. Further, the photocoupler 216, the solenoid-operated valve coil 220, the light emitting diodes 218, 224, the resistor 226, and the diode 222, which are driven by the outputs from the output terminals OUT3, OUT4 of the solenoid-operated valve driving control circuit 202-1, are connected. The switch 252 is set in the ON state, and the input terminal S/D* is grounded.

When the solenoid-operated valve has the single-coil structure, the photocoupler 204, the solenoid-operated valve coil 208, the light emitting diodes 206, 212, the resistor 214, and the diode 210, which are driven by the outputs from the output terminals OUT1, OUT2 of the solenoid-operated valve driving control circuit 202-1 shown in FIG. 19, are connected. The switch 252 is set in the OFF state, and the input terminal S/D* is not grounded. The photocoupler 216, the light emitting diodes 218, 224, the solenoid-operated valve coil 220, the resistor 246, and the diode 222 are removed without being connected. These features will be easily appreciated in view of the solenoid-operated valve driving control circuit 202 shown in FIG. 3 as well.

Next, explanation will be made for the function of the driving control apparatus for the solenoid-operated valve to which the method of driving and controlling the solenoid-operated valve according to the second embodiment of the present invention constructed as described above is applied.

With reference to FIGS. 1 and 2, the serial communication is performed for the PLC 12 and the gateway 15 via the field bus 14. The communication between the PLC 12 and the gateway 15 includes, for example, the opening/closing control data for the solenoid-operated valve, the driving signal for the indicating light emitting diode, the connection information on the solenoid-operated valve coil, and the detection information of each of the sensors. The data format is converted at the gateway 15. The communication with serial data is performed with respect to the communication control integrated circuits 22, 24, 26, 28, 100 via the solenoid-operated valve control bus 20.

The sending data format outputted from the gateway 15 is as shown in FIG. 5, ranging from the bit 0 to the bit 31. The bit 0 indicates a start bit. The bit 1 to the bit 6 are address data, and indicate addresses $2^0, 2^1, 2^2, 2^3, 2^4, 2^5$ respectively to designate addresses of the communication control integrated circuits 22, 24-1, 24-2, 26-1, 26-2, 26-3, 26-4, 28, 100. The communication is performed with only the communication control integrated circuit 22, 24, 26, 28, 100 having a coincident address.

The bit 7 of the sending data format is an operation mode bit for indicating whether or not the output data is included in the sending data from the gateway 15. The bit 7 at logical H means the sending mode and the output data for the respective channels CH1 to CH4 of the communication control integrated circuits 22, 24, 26, 28 are included in the bit 9 to the bit 28 of the sending data. The bit 7 at logical L means a reading mode and stop bits are sent to bit 9 and bit 10. The bit 8 is an address mode parity bit.

If the operation mode bit (the bit 7) is logical H, the bit 9 to the bit 13 of the sending data format are an output bit from the output terminal OUT1 of the channel CH1, an output bit from the output terminal OUT2, an output bit from the output terminal OUT3, an output bit from the output terminal OUT4, and a parity bit for the channel CH1, respectively.

Similarly, if the operation mode bit (the bit 7) is logical H, the bit 14 to the bit 18 of the sending data format are an output bit from the output terminal OUT1 of the channel CH2, an output bit from the output terminal OUT2, an output bit from the output terminal OUT3, an output bit from the output terminal OUT4, and a parity bit for the channel CH2. The bit 19 to the bit 23 of the sending data format are an output bit from the output terminal OUT1 of the channel CH3, an output bit from the output terminal OUT2, an output bit from the output terminal OUT3, an output bit from the output terminal OUT4, and a parity bit for the channel CH3. The bit 24 to the bit 28 of the sending data format are an output bit from the output terminal OUT1 of the channel CH4, an output bit from the output terminal OUT2, an output bit from the output terminal OUT3, an output bit from the output terminal OUT4, and a parity bit for the channel CH4, respectively.

The bit 29 of the sending data format is an output synchronization bit. If the bit 29 is logical H, the data of the solenoid-operated valve control bus 20 is set to the communication control integrated circuits 22, 24, 26, 28 to which the corresponding address is allotted. Accordingly, the bit 29 functions as if a strobing pulse is provided for a latching circuit. The setting of data is performed in the PLC 12 in parallel. The set data is converted into serial data and transmitted to the solenoid-operated valve driving control circuit 202-1 of the communication control integrated unit 200-1 at the substantially corresponding channel.

For example, if the sending data designates the address of the communication control integrated circuit 22, and the bit 7 is logical H, then the communication control integrated circuit 22 receives the sending data, and it is judged that the communication is performed for itself according to the address. The data for the bit 9 to the bit 29 is received, and the data ranging from the bit 9 to the bit 28 is incorporated in accordance with logical H of the bit 29.

The data ranging from the bit 9 to the bit 12 of the incorporated data ranging from the bit 9 to the bit 29 is converted into serial data and outputted from the channel CH1. Similarly, the data ranging from the bit 14 to the bit 17 of the incorporated data ranging from the bit 9 to the bit 29 is converted into serial data and outputted from the channel CH2. The data ranging from the bit 19 to the bit 22 is converted into serial data and outputted from the channel CH3. The data ranging from the bit 24 to the bit 27 is converted into serial data and outputted from the channel CH4. During this process, it is a matter of course that the parity check is performed by the parity bit 13, the parity bit 18, the parity bit 23, and the parity bit 28.

In particular, the format of the sending serial data outputted from the channel CH1 of the communication control integrated circuit 22 is as shown in FIG. 8A. The bit 0 is a start bit, the bit 1 corresponds to the logical output outputted from the output terminal OUT1 of the channel CH1, the bit 2 corresponds to the logical output outputted from the output terminal OUT2 of the channel CH1, the bit 3 corresponds to the logical output outputted from the output terminal OUT3 of the channel CH1, the bit 4 corresponds to the logical output outputted from the output terminal OUT4 of the channel CH1, the bit 5 is a parity bit, and the bit 6 and the bit 7 are stop bits. The formats of the sending serial data outputted from the channels CH2, CH3, CH4 of the communication control integrated circuit 22 are the same as described above.

The inputted serial data is converted into parallel data in the solenoid-operated valve driving control circuit 202-1 which has received the output serial data from the channel CH1 of the communication control integrated circuit 22. Accordingly, the ON/OFF control is performed for the solenoid-operated valve coils 208, 220 connected to the output terminals OUT1, OUT2, OUT3, OUT4 of the solenoid-operated valve driving control circuit 202-1, and the flashing of the light emitting diodes 206, 212, 218, 224 is controlled.

Therefore, when the output synchronization bit (the bit 29) is logical H, the outputs of the output terminals OUT1 to OUT4 of the channel CH1 are controlled to be corresponding logical values based on whether or not bits (the bit 9 to the bit 12) are logical H. The solenoid-operated valve coils 208, 220 connected to the output terminals OUT1, OUT3 of the channel CH1 are controlled to be in the excitation or non-excitation state. The light emission of the light emitting diodes 206, 218 connected to the output terminals OUT1, OUT3 of the channel CH1 is controlled. The excitation or non-excitation states of the solenoid-operated valve coils 208, 220 are clearly indicated.

The light emitting diode 212 may be connected to the output terminal OUT2, and the data outputted to the output terminal OUT1 may be made identical with the data outputted to the output terminal OUT2 (logical value of the bit 9 may be made identical with that of the bit 10). Accordingly, even when the solenoid-operated valve coil 208 is not connected, it is possible to know that the signal for driving the solenoid-operated valve coil 208 is outputted by the light emission of the light emitting diode 212, which is convenient when the maintenance is performed. Further, when the light emitting diode 206 does not emit light, and the light emitting diode 212 emits light although the solenoid-operated valve coil 208 is supposed to be connected, then it is possible to know that the solenoid-operated valve coil 208 suffers from breaking of wire, which is convenient when the maintenance is performed.

The light emitting diode 224 may be connected to the output terminal OUT4, and the data outputted to the output terminal OUT3 may be made identical with the data outputted to the output terminal OUT4 (logical value of the bit 11 may be made identical with that of the bit 12). Accordingly, even when the solenoid-operated valve coil 220 is not connected, it is possible to know that the signal for driving the solenoid-operated valve coil 220 is outputted by the light emission of the light emitting diode 224, which is convenient when the maintenance is performed. Further, when the light emitting diode 218 does not emit light, and the light emitting diode 224 emits light although the solenoid-operated valve coil 220 is supposed to be connected, then it is possible to know that the solenoid-operated valve coil 220 suffers from breaking of wire, which is convenient when the maintenance is performed.

Similarly, the output logical values of the output terminals OUT1 to OUT4 of the channels CH2, CH3, CH4 are determined by the logical values set in the bit 14 to the bit 17 of the sending data format, by the logical values set in bit the 19 to the bit 22, and by the logical values set in the bit 24 to the bit 27, respectively, in the cited order. The solenoid-operated valve coil is controlled to be in the excitation or non-excitation state based on the logical value, and the light emission of the light emitting diodes 206, 212, 218, 224 is controlled in the same manner as in the case of the channel CH1. The operation is performed in the same manner as described above for the other communication control integrated circuits.

It is judged that the sending of the data at this time to the communication control integrated circuit 22 comes to an end by means of the bit 30 and the bit 31 of the sending data format.

The foregoing description is illustrative of the case that the sending data designates the address of the communication control integrated circuit 22. However, as shown in FIG. 7A, the sending data is transmitted to other communication control integrated circuits having different addresses at predetermined intervals, for example, for an address 1, an address 2, an address 3, an address 4, an address 5 and so forth. When the sending data is received, the serial data is sent to the communication control circuit, for example, to the solenoid-operated valve driving control circuit 202-1 from the communication control integrated circuits 24-1, 24-2, 26-1, 26-2, 26-3, 26-4, 28.

The opening/closing control data composed of serial data is successively transmitted to the solenoid-operated valve driving control circuit as shown in FIG. 9A from each of the channels CH of the communication control integrated circuits 22, 24-1, 24-2, 26-1, 26-2, 26-3, 26-4, 28 which have received the serial data from the solenoid-operated valve control bus 20.

The control is performed in accordance with the output from the solenoid-operated valve driving control circuit, for example, the solenoid-operated valve driving control circuit 202-1 which has received the opening/closing control data having the serial data structure. As a result, the data indicating the open, closed, or intermediate position of the solenoid-operated valve detected by the sensors 248, 250, 251, is supplied to the input terminals IN1, IN2, IN3, IN4, IN5 via a decoder 401, 402, 403, or 404. The data indicating whether the coil of the solenoid-operated valve has the double-coil structure or the single-coil structure is supplied to the input terminal S/D*. The data indicating the open, closed, or intermediate position of the solenoid-operated valve and the data supplied to the input terminal S/D* are transmitted to the communication control integrated circuit as the response data as shown in FIG. 9B within a predetermined period after the sending serial data for controlling the solenoid-operated valve coil is transmitted.

The response data format of the response data transmitted from the solenoid-operated valve driving control circuit 202-1 to the communication control integrated circuit 22 is as shown in FIG. 22 in place of FIG. 8B because of the presence of the data of the input terminal IN3. The bit 0 indicates a start bit, the bit 1 is the logical value of the output from the sensor 248 inputted into the input terminal IN1 of the channel CH1, and the bit 2 is the logical value-of the output from the sensor 250 inputted into the input terminal IN2 of the channel CH1. The bit 3 is the logical value of the output from the sensor 251 inputted into the input terminal IN3 of the channel CH1. The bit 4 is the logical value supplied to the input terminal S/D*, which is logical H in the case of the single-coil structure or which is logical L in the case of the double-coil structure. The bit 5 indicates parity bit, and the bit 6 and the bit 7 are stop bits.

The response data sent from the solenoid-operated valve driving control circuit 202-1 to the communication control integrated circuit 22 is converted into serial data and sent to the communication control integrated circuit 22. This procedure is performed in the same manner as described above for the response data sent from the other solenoid-operated valve driving control circuits 202-1 to the corresponding other communication control integrated circuits 24-1, 24-2, 26-1, 26-2, 26-3, 26-4, 28. The sending timing is as shown in FIG. 9B. The data is sent with a delay of predetermined period from the sending serial data.

The response data from the solenoid-operated valve driving control circuit 202 used when the solenoid-operated valve coil is not connected to the output terminals OUT1, OUT3 of the solenoid-operated valve driving control circuit 202-1 has the output of logical H as shown in FIG. 10B for the serial data shown in FIG. 10A. In this case, enables (ENABLES, bits 13, 19, 25, 31 in FIG. 21) in the response data shown in FIG. 21 as described later on are set to logical L. It is indicated that the solenoid-operated valve is not connected.

The response data having the serial data structure and outputted from the solenoid-operated valve driving control circuit 202-1 provided for the solenoid-operated valve 30 is transmitted to the channel CH1 of the communication control integrated circuit 22. The response data having the serial data structure and outputted from the solenoid-operated valve driving control circuit 202-1 provided for the solenoid-operated valve 32 is transmitted to the channel CH2 of the communication control integrated circuit 22. The response data having the serial data structure and outputted from the solenoid-operated valve driving control circuit 202-1 provided for the solenoid-operated valve 34 is transmitted to the channel CH3 of the communication control integrated circuit 22. The response data having the serial data structure and outputted from the solenoid-operated valve driving control circuit 202-1 provided for the solenoid-operated valve 36 is transmitted to the channel CH4 of the communication control integrated circuit 22.

In the communication control integrated circuit 22 which has received the response data having serial data structure supplied to the channels CH1, CH2, CH3, CH4, the response data is converted into parallel data for each of the channels CH. The address data allotted to the communication control integrated circuit 22, the operation mode bit, the address mode parity bit, the enable bit and the parity bit for the serial data inputted from each channel CH, the judgment bit for the use of output or the use of input, and the stop bits are added to the converted parallel data to generate the parallel response data having the format shown in FIG. 21, then converted into serial data. A bit 0 through a bit 35 shown in FIG. 21 are successively sent to the solenoid-operated valve control bus 20. As shown in FIG. 7B, the response data of the bit 0 to the bit 35 is outputted and sent by a predetermined delay as compared with the transmission of the sending data shown in FIG. 7A. FIG. 7B is illustrative of the case that the solenoid-operated valve is not connected to the solenoid-operated valve driving control circuit connected to the communication control integrated circuit corresponding to the address 3 and the address 5.

In particular, as for the response data outputted from the communication control integrated circuit (see FIG. 21), a bit 0 indicates a start bit. The bits 1 to 6 indicate respective address data for address data $2^0$, $2^1$, $2^2$, $2^3$, $2^4$, $2^5$. The bit 7 indicates operation mode bit as the bit indicating the response data from the communication control integrated circuit 22, 24, 26, 28 in the case of logical H or indicating the response data from the communication control integrated circuit 100 in the case of logical L. The bit 8 indicates address mode parity bit.

In FIG. 21, when the operation mode bit is logical H, the bit 9 to the bit 14 indicate the data supplied to the input terminal IN1, the input terminal IN2, the input terminal IN3, and S/D* of the channel CH1, the data indicating whether or not the solenoid-operated valve is connected, and the parity data therefor, respectively. The bit 15 to the bit 20 indicate the data supplied to the input terminal IN1, the input terminal IN2, the input terminal IN3, and S/D* of the channel CH2, the data indicating whether or not the solenoid-operated valve is connected, and the parity data therefor, respectively. The bit 21 to the bit 26 indicate the data supplied to the input terminal IN1, the input terminal IN2, the input terminal IN3, and S/D* of the channel CH3, the data indicating whether or not the solenoid-operated valve is connected, and the parity data therefor, respectively. The bit 27 to the bit 32 indicate the data supplied to the input terminal IN1, the input terminal IN2, the input terminal IN3, and S/D* of the channel CH4, the data indicating whether or not the solenoid-operated valve is connected, and the parity data therefor, respectively. The bit 33 indicates judgment bit for the use of input or the use of output. The bit 34 and the bit 35 indicate stop bits.

Next, explanation will be made with reference to FIGS. 23A, 23B, 23C, 24A, and 24B for the relationship between the outputs of the sensors 248, 250, 251 and the open, closed, and intermediate positions of the solenoid-operated valve.

Figure 23A:
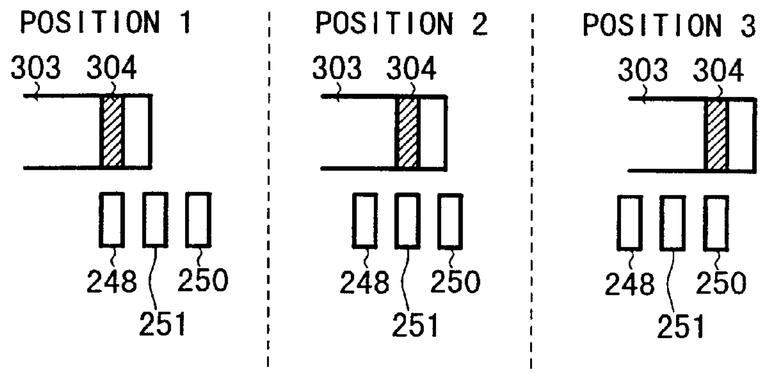
FIG. 23A schematically shows relative positions of a magnet ring and sensors to be used for the method of driving and controlling the solenoid-operated valve according to the second embodiment of the present invention.

A magnet ring 304 is provided for a spool valve 303 of the solenoid-operated valve. With reference to FIG. 23A, when the spool valve 303 is moved in the horizontal direction, the sensors 248, 251, 250 are successively subjected to induction to generate the output. The left in FIG. 23A is designated as a position 1 (for example, an open position of the solenoid-operated valve), the center is designated as a position 2 (for example, an intermediate position of the solenoid-operated valve), and the right is designated as a position 3 (for example, a closed position of the solenoid-operated valve).

Figure 23B:
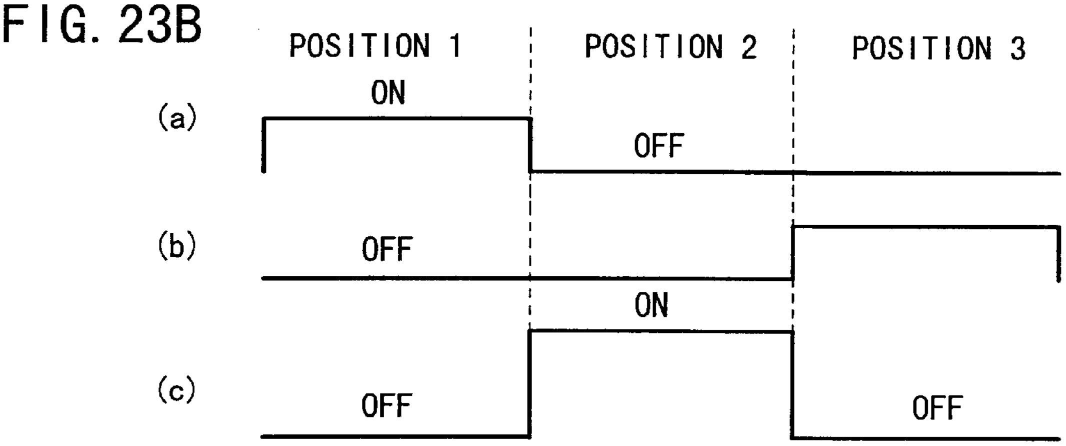
FIG. 23B shows waveforms illustrating outputs from the sensors corresponding to FIG. 23A.

When the magnet ring 304 of the spool valve 303 of the solenoid-operated valve is located at the position 1, then the sensor 248 generates the high electric potential output, and the sensor 250 and the sensor 251 generate the low electric potential outputs. When the magnet ring 304 of the spool valve 303 of the solenoid-operated valve is located at the position 2, then the sensor 248 and the sensor 250 generate the low electric potential outputs, and the sensor 251 generates the high electric potential output. When the magnet of the spool valve 303 of the solenoid-operated valve is located at the position 3, then the sensor 248 and the sensor 251 generate the low electric potential outputs, and the sensor 250 generates the high electric potential output. These states are shown in FIG. 23B. In FIG. 23B, a row (a) indicates the output of the sensor 248, a row (b) indicates the output of the sensor 250, and a row (c) indicates the output of the sensor 251.

Figure 24A:
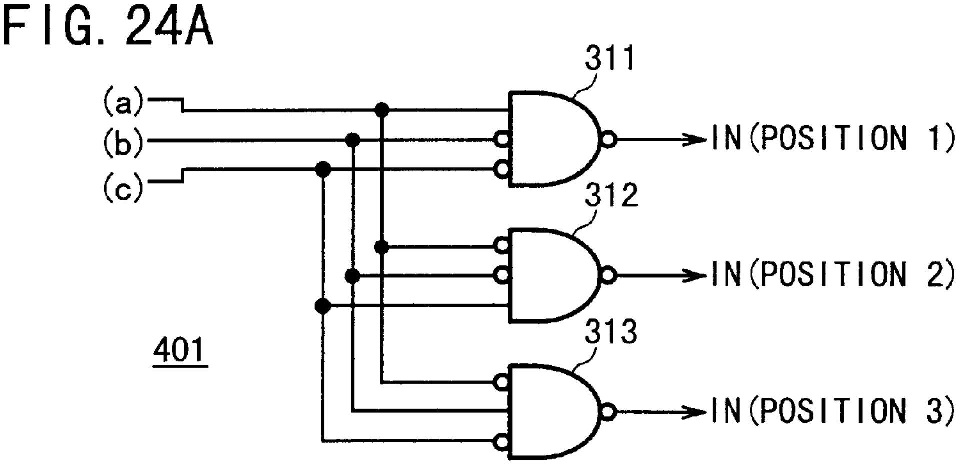
FIG. 24A is a block diagram illustrating a decoder for receiving the outputs from the sensors corresponding to FIG. 23B.

Therefore, as shown in FIG. 24A, the following configuration may be adopted. That is, a decoder 401 is provided, comprising NAND gates 311, 312, 313 to use the output (a) of the sensor 248, the output (b) of the sensor 250, and the output (c) of the sensor 251 as inputs. The respective outputs of the NAND gates 311, 312, 313 are supplied to the input terminals IN1, IN2, IN3 of the solenoid-operated valve driving control circuit 202-1 in place of the outputs of the sensors 248, 250, 251 to obtain signals for the open, intermediate, and closed positions of the solenoid-operated valve, respectively. Alternatively, the outputs of the sensors 248, 250, 251 may be supplied to the input terminals IN1, IN2, IN3 of the solenoid-operated valve driving control circuit 202-1, and the outputs from the input terminals IN1, IN2, IN3 may be decoded by a decoder 411 provided in the solenoid-operated valve driving control circuit 202-1. In the case of the former, it is necessary to externally provide the independent decoder. However, in the case of the latter, it is unnecessary to provide an external decoder, because the decoding operation is performed in the solenoid-operated valve driving control circuit 202-1.

Figure 23C:
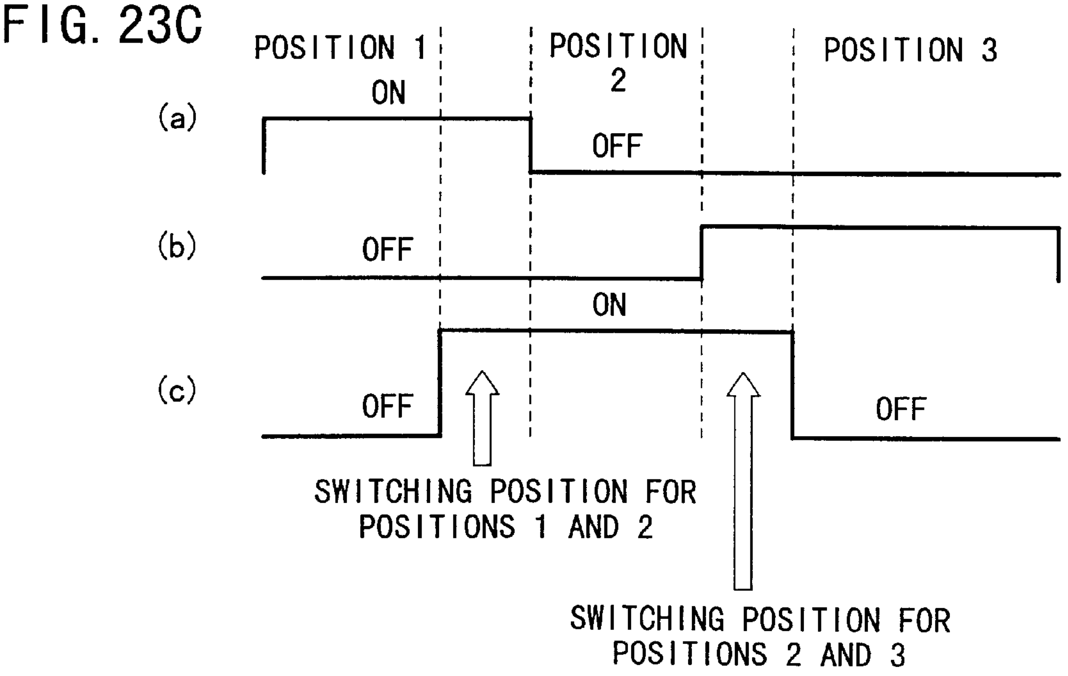
FIG. 23C shows other waveforms illustrating outputs outputted from the sensors corresponding to FIG. 23A.

Each of the sensors 248, 250, 251 may continuously generate high electric potential output until the magnet ring 304 of the spool valve 303 of the solenoid-operated valve is moved to the positions between the sensor 248, 250, 251. In this case, the outputs of the sensors 248, 250, 251 are as shown in FIG. 23C with respect to the movement of the magnet ring 304 of the spool valve 303 of the solenoid-operated valve shown in FIG. 23A. The outputs of the sensors 248, 250, 251 can be used to detect the switching position between the positions 1 and 2 and the switching position between the positions 2 and 3 in addition to the positions 1, 2, 3. These states are shown in FIG. 23C. In FIG. 23C, a row (a) indicates the output of the sensor 248, a row (b) indicates the output of the sensor 250, and a row (c) indicates the output of the sensor 251.

Figure 24B:
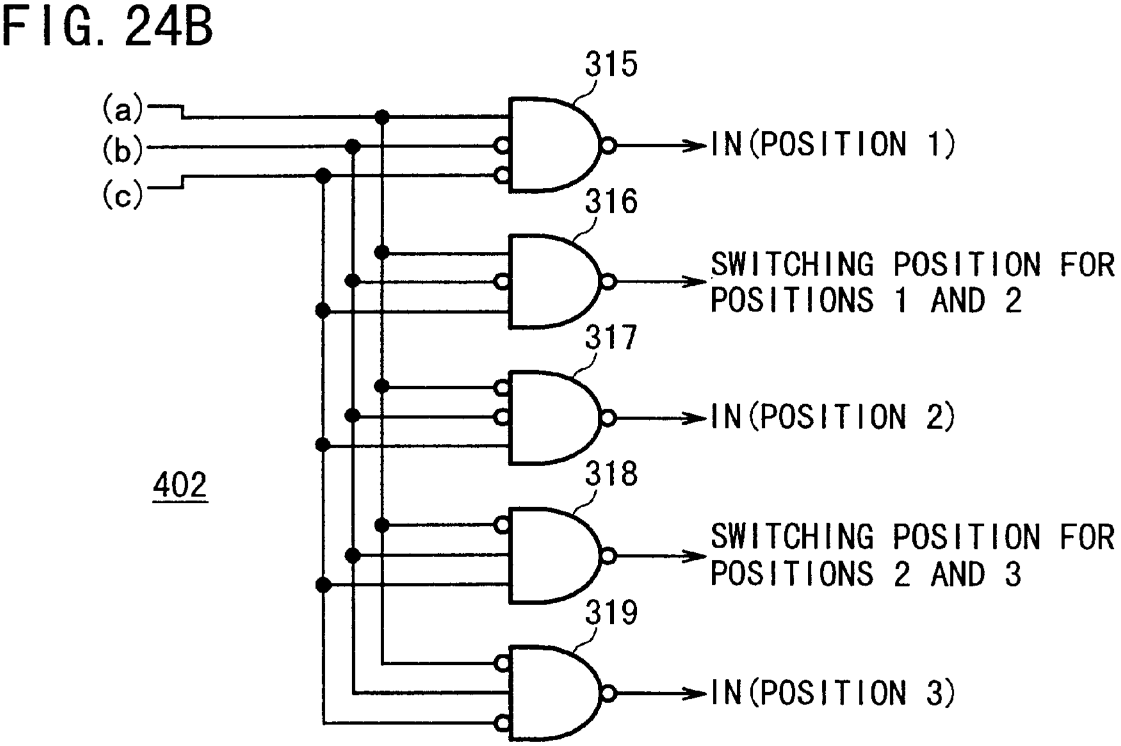
FIG. 24B is a block diagram illustrating a decoder for receiving the outputs from the sensors corresponding to FIG. 23C.

Therefore, in this case, as shown in FIG. 24B, the following configuration may be adopted. That is, a decoder 402 is provided, comprising NAND gates 315 to 319 to use the output (a) of the sensor 248, the output (b) of the sensor 250, and the output (c) of the sensor 251 as inputs. The respective outputs of the NAND gates 315 to 319 are supplied to the input terminals IN1, IN2, IN3 of the solenoid-operated valve driving control circuit 202-1 and to the newly provided input terminals IN4, IN5 of the solenoid-operated valve driving control circuit 202-1 in place of the outputs of the sensors 248, 250, 251 to obtain signals for the open position, the switching position between the open and intermediate positions, the intermediate position, the switching position between the intermediate and closed positions, and the closed position of the solenoid-operated valve, respectively.

Alternatively, in place of the decoder 402 comprising the NAND gates 315 to 319, the outputs of the sensors 248, 250, 251 may be supplied to the input terminals IN1, IN2, IN3, and the outputs from the input terminals IN1, IN2, IN3 may be decoded by a decoder 412 provided in the solenoid-operated valve driving control circuit 202-1 in place of the decoder comprising the NAND gates 315 to 319. The decoder 412 also takes the place of the decoder 411. In the case of the former, it is necessary to externally provide an independent decoder in addition to the two new input terminals IN4, IN5. In the case of the latter, it is unnecessary to provide an external decoder other than the two new input terminals IN4, IN5, because the decoding operation is performed in the solenoid-operated valve driving control circuit 202-1.

In another case, the outputs of the two sensors 248, 250 may be used to detect the open, closed, and intermediate positions of the solenoid-operated valve. An example of this case will be explained with reference to FIGS. 25A, 25B, 25C, 26A, and 26B.

Figure 25A:
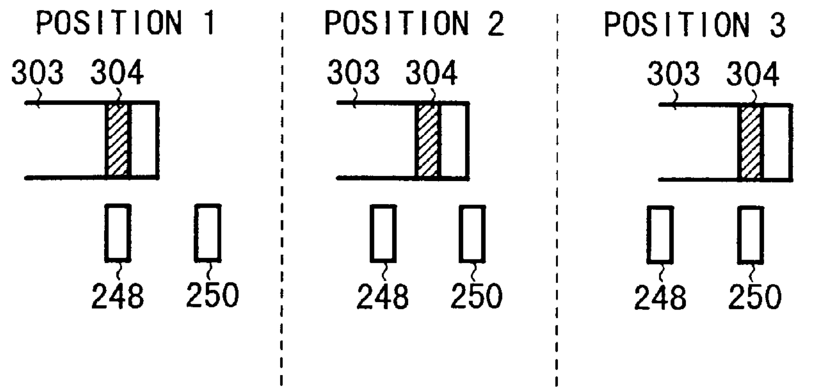
FIG. 25A schematically shows relative positions of a magnet ring and other sensors to be used for the method of driving and controlling the solenoid-operated valve according to the second embodiment of the present invention.

A magnet ring 304 is provided for a spool valve 303 of the solenoid-operated valve. With reference to FIG. 25A, when the spool valve 303 is moved in the horizontal direction, the sensors 248, 250 are successively subjected to induction to generate the output. The position of the spool valve 303 shown in the left of FIG. 25A is designated as a position 1 (for example, an open position of the solenoid-operated valve), the center is designated as a position 2 (for example, an intermediate position of the solenoid-operated valve), and the right is designated as a position 3 (for example, a closed position of the solenoid-operated valve).

Figure 25B:
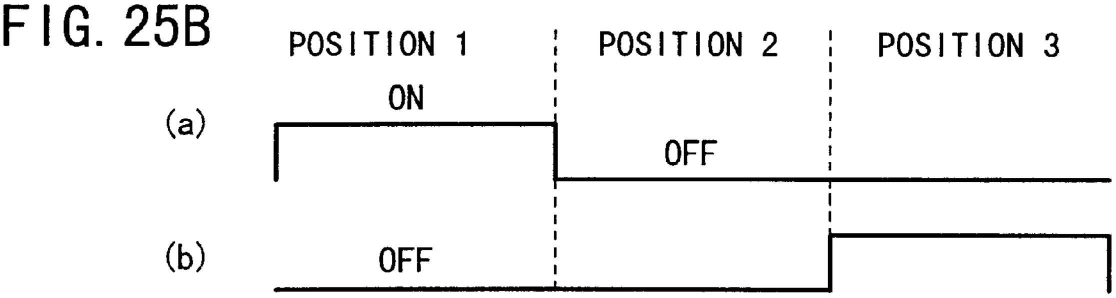
FIG. 25B shows waveforms illustrating outputs from the sensors corresponding to FIG. 25A.

When the magnet ring 304 of the spool valve 303 of the solenoid-operated valve is located at the position 1, then the sensor 248 generates the high electric potential output, and the sensor 250 generates the low electric potential output. When the magnet ring 304 of the spool valve 303 of the solenoid-operated valve is located at the position 2, then both of the sensor 248 and the sensor 250 generate the low electric potential outputs. When the magnet ring 304 of the spool valve 303 of the solenoid-operated valve is located at the position 3, then the sensor 248 generates the low electric potential output, and the sensor 250 generates the high electric potential output. These states are shown in FIG. 25B. In FIG. 25B, a row (a) indicates the output of the sensor 248, and a row (b) indicates the output of the sensor 250.

Figure 26A:
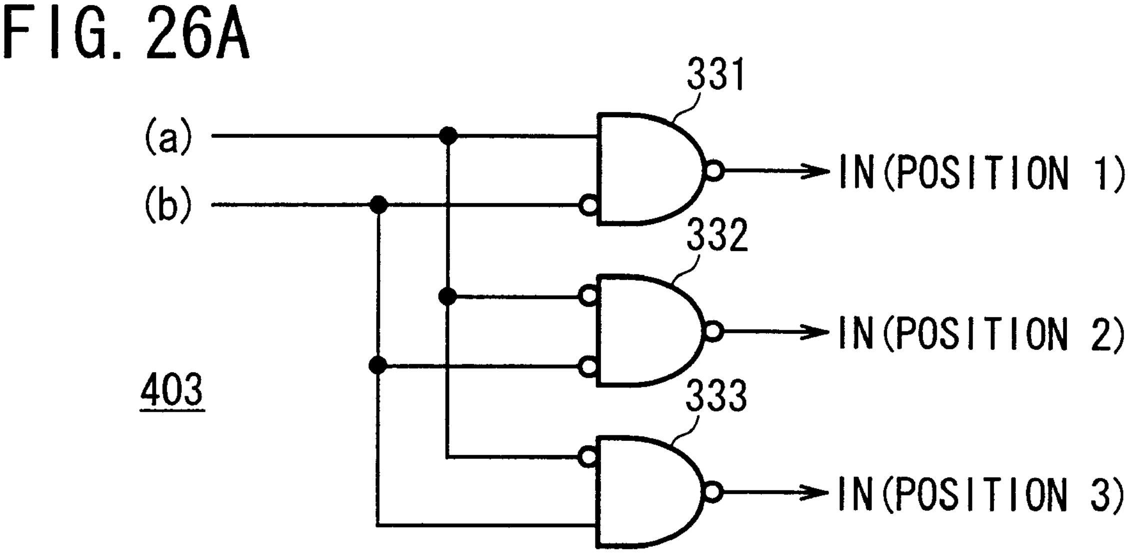
FIG. 26A is a block diagram illustrating a decoder for receiving the outputs from the sensors corresponding to FIG. 25B.

Therefore, as shown in FIG. 26A, the following configuration may be adopted. That is, a decoder 403 is provided, comprising NAND gates 331, 332, 333 to use the output (a) of the sensor 248 and the output (b) of the sensor 250 as inputs. The respective outputs of the NAND gates 331, 332, 333 are supplied to the input terminals IN1, IN2, IN3 of the solenoid-operated valve driving control circuit 202-1 in place of the outputs of the sensors 248, 250 to obtain signals for the open, intermediate, and closed positions of the solenoid-operated valve, respectively. Alternatively, the outputs of the sensors 248, 250 may be supplied to the input terminals IN1, IN2 of the solenoid-operated valve driving control circuit 202-1, and the outputs from the input terminals IN1, IN2 may be decoded by a decoder 413 provided in the solenoid-operated valve driving control circuit 202-1. The decoder 413 has two input terminals and also takes the place of the decoder 411(412). In the case of the former, it is necessary to externally provide an independent decoder. However, in the case of the latter, it is unnecessary to provide an external decoder and the input terminal IN3 as well, because the decoding operation is performed in the solenoid-operated valve driving control circuit 202-1.

Figure 25C:
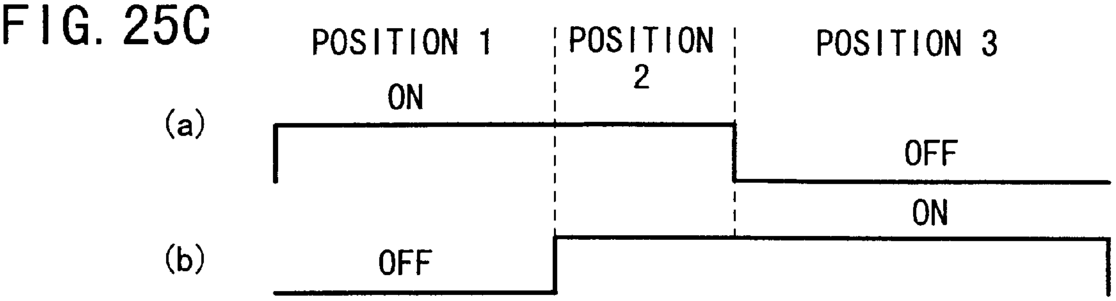
FIG. 25C shows waveforms illustrating other outputs from the sensors corresponding to FIG. 25A.

Each of the sensors 248, 250 may continuously generate the high electric potential output until the magnet ring 304 of the spool valve 303 of the solenoid-operated valve is moved to the position between the sensors 248, 250. In this case, the outputs of the sensors 248, 250 are as shown in FIG. 25C with respect to the movement of the magnet ring 304 of the spool valve 303 of the solenoid-operated valve shown in FIG. 25A. The outputs of the sensors 248, 250 can be used to detect the locations of the positions 1, 2, 3. These states are shown in FIG. 25C. In FIG. 25C, a row (a) indicates the output of the sensor 248, and a row (b) indicates the output of the sensor 250.

Figure 26B:
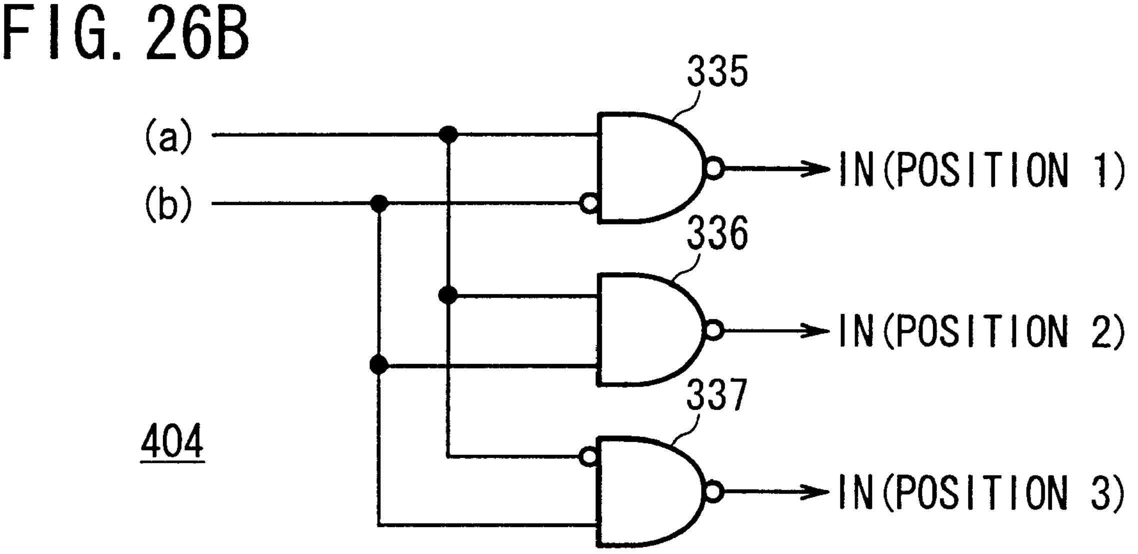
FIG. 26B is a block diagram illustrating a decoder for receiving the outputs from the sensors corresponding to FIG. 25C.

In this case, as shown in FIG. 26B, the following configuration may be adopted. That is, a decoder 404 is provided, comprising NAND gates 335 to 337 to use the output (a) of the sensor 248 and the output (b) of the sensor 250 as inputs, is provided. The respective outputs of the NAND gates 335 to 337 are supplied to the input terminals IN1, IN2, IN3 of the solenoid-operated valve driving control circuit 202-1 in place of the outputs of the sensors 248, 250 to obtain signals for the open position, the intermediate position, and the closed position of the solenoid-operated valve, respectively.

Alternatively, in place of the decoder 404 comprising the NAND gates 335 to 337, the outputs of the sensors 248, 250 may be supplied to the input terminals IN1, IN2 of the solenoid-operated valve driving control circuit 202-1, and the outputs from the input terminals IN1, IN2 may be decoded by a decoder 414 provided in the solenoid-operated valve driving control circuit 202-1 in place of the decoder 413. The decoder 414 has two input terminals and takes the place of the decoder 402 comprising the NAND gates 315 to 319. In the case of the former, it is necessary to externally provide an independent decoder. However, in the case of the latter, it is unnecessary to provide an external decoder and the input terminal IN3, because the decoding operation is performed in the solenoid-operated valve driving control circuit 202-1.

Based on the output from the solenoid-operated valve driving control circuit 202-1 as described above, the gateway 15 receives the output serial data of the response data format shown in FIG. 21 outputted from the communication control integrated circuit 22, converts the data format based on the protocol, and outputs via the field bus 14.

If the operation mode bit (the bit 7) is logical L (see FIG. 21), then the parity bit based on the arithmetic operation result is added for every 4 bits as shown in a right column in FIG. 21 to the signal data from the sensor inputted into the communication control integrated circuit 100 for the bit 9 to the bit 28. The bit 29, the bit 30, and the bit 31 are further added, and the data is transmitted to the solenoid-operated valve control bus 20. This procedure is performed in the same manner as in the first embodiment of the present invention shown in the right column in FIG. 6.

As described above, according to the method of driving and controlling the solenoid-operated valve concerning the second embodiment of the present invention, the open, closed, and intermediate positions of the plurality of solenoid-operated valves can be controlled based on the data sent from the gateway 15 via the solenoid-operated valve control bus 20 by using the outputs of the communication control integrated circuits 22, 24, 26, 28 and the solenoid-operated valve driving control circuit 202-1 receiving the signals therefrom. Further, signals are sent to the gateway 15 via the solenoid-operated valve control bus 20 for indicating the open, closed, and intermediate position states of the plurality of solenoid-operated valves based on the control from the communication control integrated circuits 22, 24, 26, 28 and the solenoid-operated valve driving control circuit 202-1. The state of the open, closed, or intermediate position of the solenoid-operated valve is managed based on the data.

Further, the response data based on the output of the sensor inputted into the communication control integrated circuit 100 is also sent to the gateway 15 via the solenoid-operated valve control bus 20. The signal of the sensor outputted to the communication control integrated circuit 100 can be also managed based on the response data.

As described above, the solenoid-operated valve is provided with the communication control integrated unit 200-1 which includes the solenoid-operated valve driving control circuit 202-1. Therefore, in the same manner as in the first embodiment according to the present invention as shown in FIG. 11, the interconnection is made with first connectors to construct a manifold 55, the solenoid-operated valves 30, 32, 34, 36, . . . are individually installed to second connectors of manifold segments 55-1, 55-2, 55-3, 55-4, . . . of the manifold 55 to drive and control the solenoid-operated valves 30, 32, 34, 36, . . . by the first connectors and the second connectors. Then, it is enough to use, for each of the solenoid-operated valves 30, 32, 34, 36, . . . , each one of electrical conductive passage Sr1, Sr2, Sr3, Sr4 for wiring to drive and control the solenoid-operated valves 30, 32, 34, 36, . . . , in addition to a common power source and a ground line. The electrical conductive passage Sr1, Sr2, Sr3, Sr4 introduces the serial data from one output terminal OUT of the communication control integrated circuit to each of the solenoid-operated valves as shown in FIG. 11, irrelevant to the single-coil structure and the double-coil structure of the coil of the solenoid-operated valve.

Therefore, even when it is necessary to exchange the solenoid-operated valve having the double-coil structure with the solenoid-operated valve having the single-coil structure, or even when it is necessary to exchange the solenoid-operated valve having the single-coil structure with the solenoid-operated valve having the double-coil structure, then it is enough to exchange only the solenoid-operated valve to be installed to the manifold segment. This procedure is performed by switching the switch 252 of the solenoid-operated valve. It is also unnecessary to change the wiring configuration. It is also unnecessary to change the substrate of the connector section. Further, it is also unnecessary to exchange the manifold segment. It is also easy to respond to the change of the design of the automatic assembling system.

Therefore, in contrast to the conventional cases shown in FIGS. 12A and 12B, it is unnecessary to prepare two types of substrates for the single-coil structure and the double-coil structure, and it is unnecessary not only to exchange the solenoid-operated valve but also to exchange the substrate in the second embodiment of the present invention as well, in the same manner as in the first embodiment of the present invention.

Figure 27:
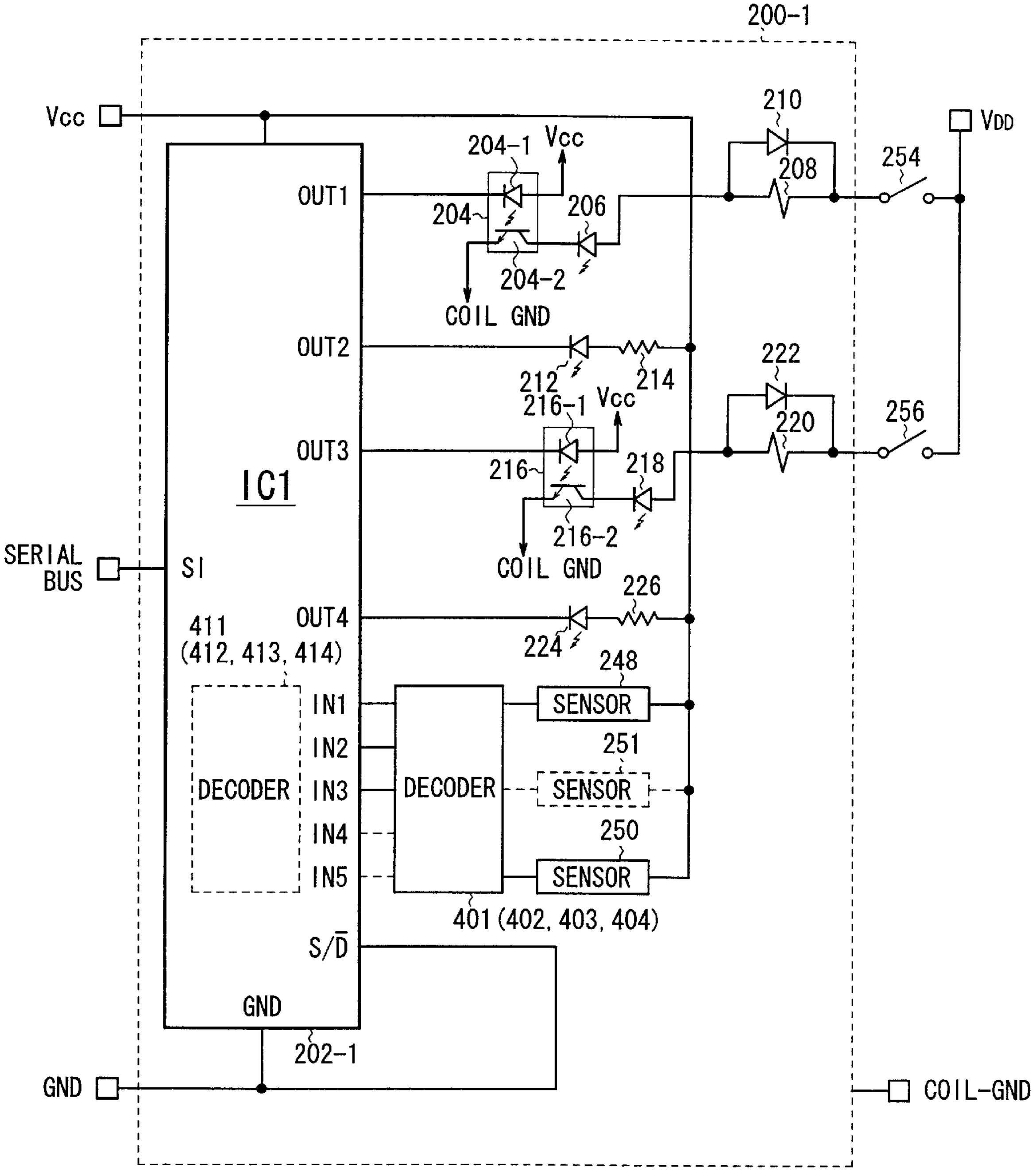
FIG. 27 illustrates a case that external interlock is provided for the driving of a solenoid-operated valve coil in the method of driving and controlling the solenoid-operated valve according to the second embodiment of the present invention.

Further, a configuration may be made as shown in FIG. 27 corresponding to the first modified embodiment of the first embodiment of the present invention. In this case, in the communication control integrated unit 200-1, the power source $V_{DD}$ is applied to the solenoid-operated valve coil 208 by an external switch 254, and the power source $V_{DD}$ is applied to the solenoid-operated valve coil 220 by an external switch 256, making it possible to effect the interlock with the external switches 254, 256 as well.

Figure 28:
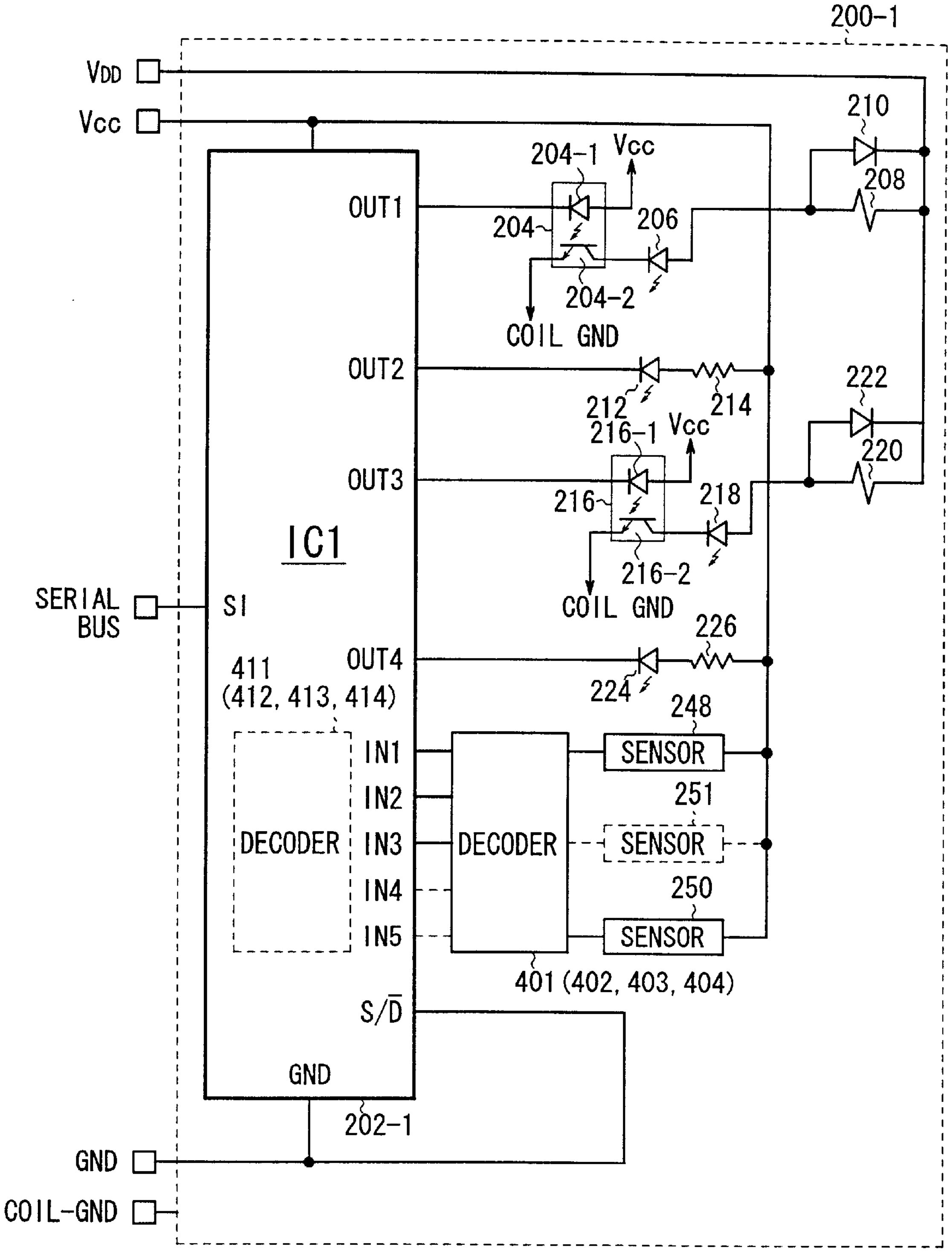
FIG. 28 illustrates a system to be exclusively used for a solenoid-operated valve having a double-coil structure in the method of driving and controlling the solenoid-operated valve according to the second embodiment of the present invention.

Alternatively, a configuration may be made as shown in FIG. 28 corresponding to the second modified embodiment of the first embodiment of the present invention. In this case, the input terminal S/D* of the solenoid-operated valve driving control circuit 202-1 shown in FIG. 19 is pulled down to the ground, thereby making it possible to be exclusively used for the solenoid-operated valve having the double-coil structure.

Figure 29:
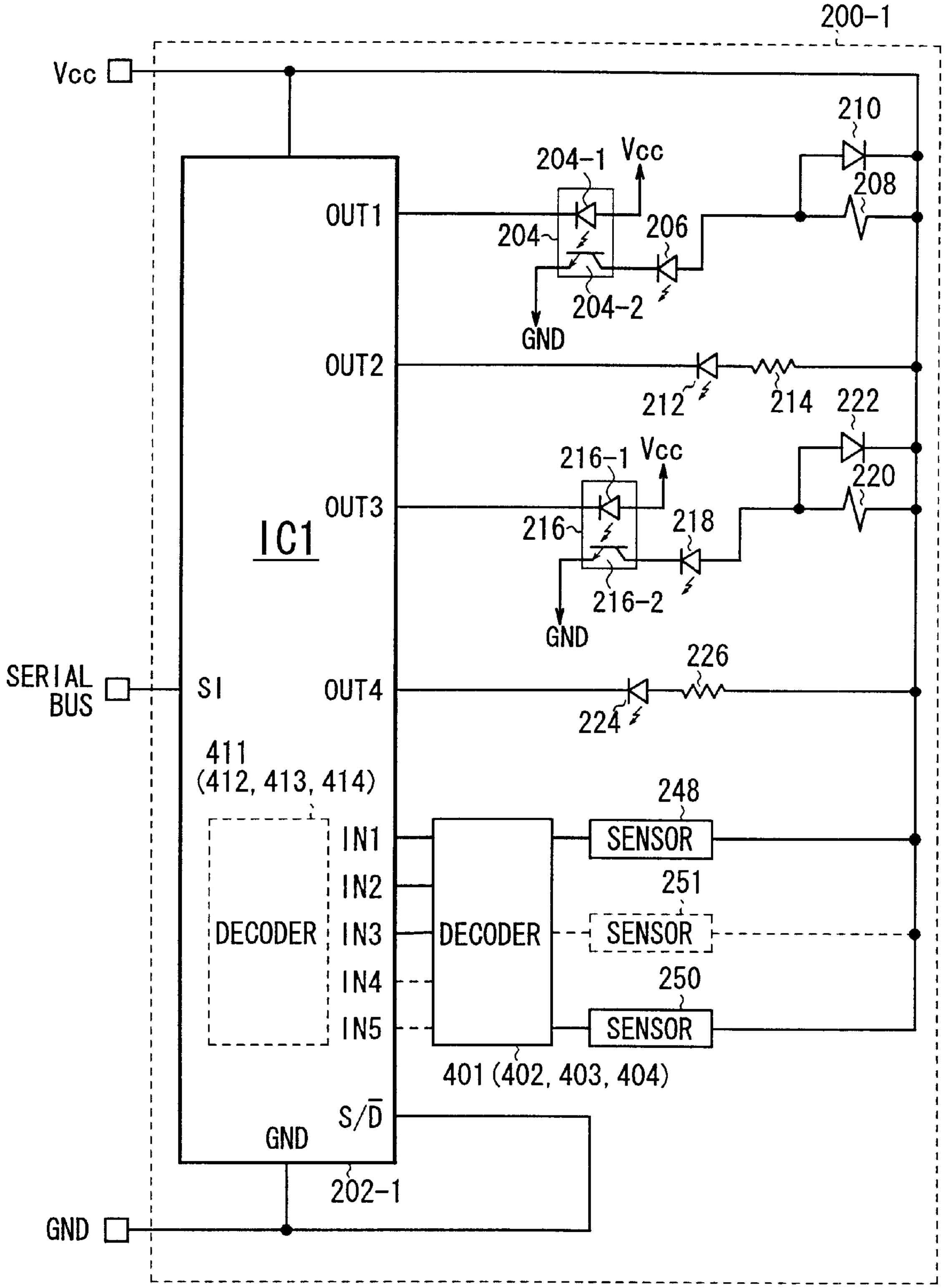
FIG. 29 illustrates a system in which a power source is commonly used for a solenoid-operated valve driving control circuit and a solenoid-operated valve coil in the method of driving and controlling the solenoid-operated valve according to the second embodiment of the present invention.

In another case, a configuration may be made as shown in FIG. 29 corresponding to the fourth modified embodiment of the first embodiment of the present invention, when a common power source is used for the power source of the solenoid-operated valve and the power source of the solenoid-operated valve driving control circuit 202-1. In this case, in a communication control integrated unit 200-1, the power source $V_{DD}$ and the power source $V_{CC}$ are common, and the ground is also common to the coil ground.

Figure 30:
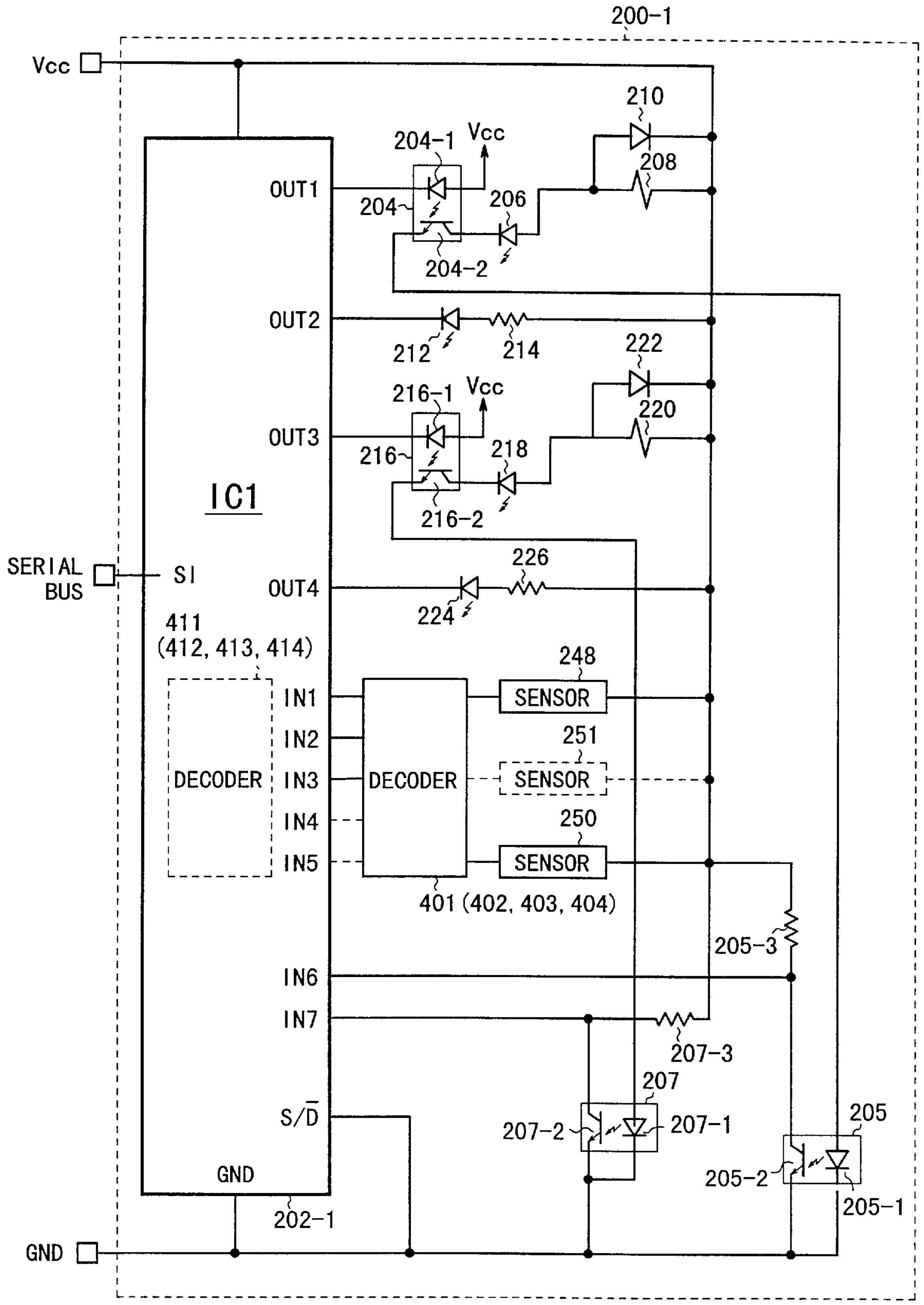
FIG. 30 illustrates a system in which a power source is commonly used for a solenoid-operated valve driving control circuit and a solenoid-operated valve coil and wire breaking of the solenoid-operated valve coil is detected in the method of driving and controlling the solenoid-operated valve according to the second embodiment of the present invention.

Alternatively, a configuration may be made as shown in FIG. 30 corresponding to the fifth modified embodiment of the first embodiment of the present invention. In this case, in a solenoid-operated valve driving control circuit shown in FIG. 29, the light emitting diode 205-1 of the photocoupler 205 is driven by the output of the phototransistor 204-2 of the interface circuit. The voltage of the power source $V_{CC}$ is applied to the phototransistor 205-2 of the photocoupler 205 through the resistor 205-3, and the light emission of the light emitting diode 205-1 is received by the phototransistor 205-2. The collector output of the phototransistor 205-2 is supplied to an input terminal IN6 which is newly provided for the solenoid-operated valve driving control circuit 202-1. In this configuration, the photocoupler 205 functions as a sensor for detecting whether or not the solenoid-operated valve coil 208 suffers from wire breaking.

Further, the following configuration may be available. That is, the light emitting diode 207-1 of the photocoupler 207, is driven by the output of the phototransistor 216-2 of the interface circuit. The voltage of the power source $V_{CC}$ is applied to the phototransistor 207-2 of the photocoupler 207 through a resistor 207-3, and the light emission of the light emitting diode 207-1 is received by the phototransistor 207-2. The collector output of the phototransistor 207-2 is supplied to an input terminal IN7 which is newly provided for the solenoid-operated valve driving control circuit 202-1. In this configuration, the photocoupler 207 functions as a sensor for detecting whether or not the solenoid-operated valve coil 220 suffers from breaking of wire.

When such a configuration is adopted, the light emitting diode 205-1 is driven to emit light if the solenoid-operated valve coil 208 is normal upon the driving by the photocoupler 204. The phototransistor 205-2 is controlled to be in the ON state, and the signal indicating that the solenoid-operated valve coil 208 is normal is transmitted to the solenoid-operated valve driving control circuit 202-1 via the input terminal IN6. Therefore, it is possible to know that the solenoid-operated valve coil 208 is normal on the PLC 12.

If the solenoid-operated valve coil 208 suffers from wire breaking or contact failure upon the driving by the photocoupler 204, the light emitting diode 205-1 is not driven. The phototransistor 205-2 is controlled to be in the OFF state, and the signal indicating that the solenoid-operated valve coil 208 suffers from wire breaking is transmitted to the solenoid-operated valve driving control circuit 202-1 via the input terminal IN6. Therefore, it is possible to know that the solenoid-operated valve coil 208 suffers from wire breaking on the PLC 12.

Similarly, if the solenoid-operated valve coil 220 is normal upon the driving by the photocoupler 216, then the light emitting diode 207-1 is driven and emits light. The phototransistor 207-2 is controlled to be in the ON state, and the signal indicating that the solenoid-operated valve coil 220 is normal is transmitted to the solenoid-operated valve driving control circuit 202-1 via the input terminal IN7. Therefore, it is possible to known that the solenoid-operated valve coil 220 is normal on the PLC 12.

If the solenoid-operated valve coil 220 suffers from wire breaking or contact failure upon the driving by the photocoupler 216, the light emitting diode 207-1 is not driven. The phototransistor 207-2 is controlled to be in the OFF state, and the signal indicating that the solenoid-operated valve coil 220 suffers from wire breaking is transmitted to the solenoid-operated valve driving control circuit 202-1 via the input terminal IN7. Therefore, it is possible to know that the solenoid-operated valve coil 220 suffers from wire breaking on the PLC 12.

Alternatively, resistors may be connected in place of the photocouplers 205, 207. The voltage drop based on the current flowing through the resistor may be individually applied to each of the input terminals IN6, IN7. In this case, the resistors function as short circuit sensors for the solenoid-operated valve coils 208, 220 respectively.

When the configuration as described above is adopted, the current based on the driving current of the solenoid-operated valve coil 208, 220 flows through the resistor. The voltage drop of the resistor brought about by the electric power application is logical H when the solenoid-operated valve coil 208, 220 forms the short circuit. It is possible to know that the solenoid-operated valve coil 208, 220 suffers from the short circuit formation on the PLC 12.

Figure 31:
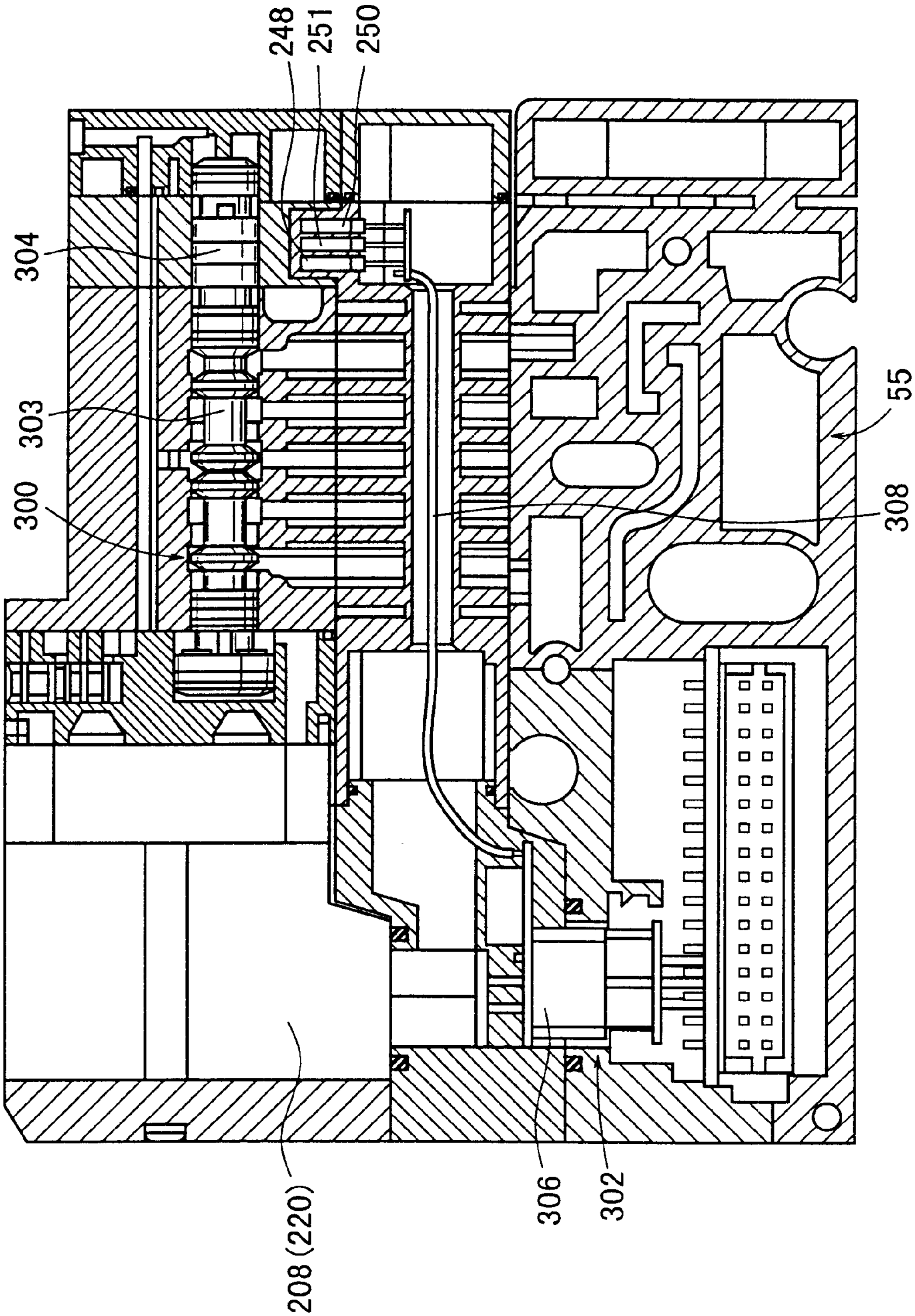
FIG. 31 is a vertical sectional view illustrating the solenoid-operated valve to be used for the method of driving and controlling the solenoid-operated valve according to the second embodiment of the present invention.

Next, FIG. 31 is a vertical sectional view illustrating the solenoid-operated valve to be used for the method of driving and controlling the solenoid-operated valve according to the second embodiment of the present invention.

The solenoid-operated valve comprises a solenoid-operated valve unit 300, the manifold 55, and a control unit 302, all of which are connected to one another in an integrated manner. The solenoid-operated valve unit 300 is arranged with the solenoid-operated valve coil 208 (220). The solenoid-operated valve coil 208 (220) is provided such that the solenoid-operated valve coil having the single-coil structure and the solenoid-operated valve coil having the double-coil structure are easily exchangeable by unillustrated screw members.

The solenoid-operated valve unit 300 is provided with the spool valve 303 which is displaceable substantially in the horizontal direction in accordance with the exciting action of the solenoid-operated valve coil 208 (220). The open state, the intermediate position state, or the closed state of the spool valve 303 is detected by the sensors 248, 251, 250 for detecting the magnetic field of the magnet ring 304 installed to one end thereof.

An integrated circuit 306 including the solenoid-operated valve driving control circuit 202-1 is arranged under the solenoid-operated valve unit 300. Detection signals from the sensors 248, 250, 251 are introduced into the integrated circuit 306 via a lead wire 308.

As explained above, according to the method of driving and controlling the solenoid-operated valve concerning the present invention, the driving operation of the solenoid-operated valve and the management of the open/closed state thereof can be centrally performed, and it is possible to easily respond to the system change.

What is claimed is:

1. A method of driving and controlling a solenoid-operated valve provided with a solenoid-operated valve driving and controlling circuit for carrying out said method comprising the steps of:

receiving solenoid-operated valve opening/closing control data from a serial bus as serial data including two bits for each solenoid-operated valve coil of said solenoid-operated valve;

converting said solenoid-operated valve opening/closing control data into parallel data;

driving said corresponding solenoid-operated valve coil based on one bit of said two bits for each solenoid-operated valve coil in said parallel data;

driving a first light emitting diode based on another bit;

inputting an output from a sensor for detecting at least one of open and closed states of said solenoid-operated valve and a signal indicating whether said solenoid-operated valve coil has a single-coil structure or a double-coil structure as input data; and converting said input data into serial data for sending to said serial bus.

2. A method of driving and controlling a solenoid-operated valve provided with a solenoid-operated valve driving and controlling circuit for carrying out said method comprising the steps of:

receiving solenoid-operated valve opening/closing control data from a serial bus as serial data including two bits for each solenoid-operated valve coil of said solenoid-operated valve;

converting said solenoid-operated valve opening/closing control data into parallel data;

driving said corresponding solenoid-operated valve coil based on one bit of said two bits for each solenoid-operated valve coil in said parallel data;

driving a first light emitting diode based on another bit;

inputting an output from a plurality of sensors for detecting open, closed, and intermediate positions of said solenoid-operated valve and a signal indicating whether said solenoid-operated valve coil has a single-coil structure or a double-coil structure as input data; and converting said input data into serial data for sending to said serial bus.

3. The method of driving and controlling a solenoid-operated valve according to claim 1, wherein said solenoid-operated valve coil is driven by a photocoupler as an interface circuit.

4. The method of driving and controlling a solenoid-operated valve according to claim 2, wherein said solenoid-operated valve coil is driven by a photocoupler as an interface circuit.

5. The method of driving and controlling a solenoid-operated valve according to claim 1, wherein said solenoid-operated valve coil is driven by a second light emitting diode.

6. The method of driving and controlling a solenoid-operated valve according to claim 2, wherein said solenoid-operated valve coil is driven by a second light emitting diode.

7. The method of driving and controlling a solenoid-operated valve according to claim 1, wherein said solenoid-operated valve opening/closing control data and said input data include a parity bit.

8. The method of driving and controlling a solenoid-operated valve according to claim 2, wherein said solenoid-operated valve opening/closing control data and said input data include a parity bit.

9. The method of driving and controlling a solenoid-operated valve according to claim 1, wherein a first photocoupler is connected to said solenoid-operated valve-coil in series to drive said solenoid-operated valve coil, a second photocoupler driven by an output of a phototransistor of said first photocoupler is provided, thereby an output of said second photocoupler is used as a sensor output.

10. The method of driving and controlling a solenoid-operated valve according to claim 2, wherein a first photocoupler is connected to said solenoid-operated valve coil in series to drive said solenoid-operated valve coil, a second photocoupler driven by an output of a phototransistor of said first photocoupler is provided, thereby an output of said second photocoupler is used as a sensor output.

11. The method of driving and controlling a solenoid-operated valve according to claim 1, wherein said solenoid-operated valve coil is connected to a power source via a switch for interlock.

12. The method of driving and controlling a solenoid-operated valve according to claim 2, wherein said solenoid-operated valve coil is connected to a power source via a switch for interlock.

13. The method of driving and controlling a solenoid-operated valve according to claim 2, wherein a magnet ring is provided for a spool valve of said solenoid-operated valve, a first sensor for generating an ON output opposed to said magnet ring at said open position of said solenoid-operated valve, a second sensor for generating an ON output opposed to said magnet ring at said intermediate position of said solenoid-operated valve, and a third sensor for generating an ON output opposed to said magnet ring at said closed position of said solenoid-operated valve are provided, said outputs from said first to third sensors are decoded by a decoder, and an output of said decoder is used for detecting said open, closed, and intermediate positions of said solenoid-operated valve.

14. The method of driving and controlling a solenoid-operated valve according to claim 2, wherein a magnet ring is provided for a spool valve of said solenoid-operated valve, a first sensor for generating an ON output opposed to said magnet ring at said open position of said solenoid-operated valve, a second sensor for generating an ON output opposed to said magnet ring at said intermediate position of said solenoid-operated valve, and a third sensor for generating an ON output opposed to said magnet ring at said closed position of said solenoid-operated valve are provided, and a decoder for decoding said outputs from said first to third sensors is provided in said solenoid-operated valve driving control circuit for detecting said open, closed, and intermediate positions of said solenoid-operated valve.

15. The method of driving and controlling a solenoid-operated valve according to claim 2, wherein a magnet ring is provided for a spool valve of said solenoid-operated valve, a fourth sensor for generating an ON output opposed to said magnet ring at said open position of said solenoid-operated valve and a fifth sensor for generating an ON output opposed to said magnet ring at said closed position of said solenoid-operated valve are provided, said outputs from said fourth and fifth sensors are decoded by a decoder, and an output of said decoder is used for detecting said open, intermediate, and closed positions of said solenoid-operated valve.

16. The method of driving and controlling a solenoid-operated valve according to claim 2, wherein a magnet ring is provided for a spool valve of said solenoid-operated valve, a fourth sensor for generating an ON output opposed to said magnet ring at said open position of said solenoid-operated valve and a fifth sensor for generating an ON output opposed to said magnet ring at said closed position of said solenoid-operated valve are provided, a decoder for decoding said outputs from said fourth and fifth sensors is provided in said solenoid-operated valve driving control circuit for detecting said open, closed, and intermediate positions of said solenoid-operated valve are detected by said decoder.

* * * * *